US012560275B2

(12) United States Patent
Newville et al.

(10) Patent No.: US 12,560,275 B2
(45) Date of Patent: Feb. 24, 2026

(54) ADJUSTABLE DISPLAY MOUNTING SYSTEM

(71) Applicant: Manehu Product Alliance, LLC, Carlsbad, CA (US)

(72) Inventors: Brian Newville, San Diego, CA (US); Lee Marc, Cardiff by th Sea, CA (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 0 days.

(21) Appl. No.: 18/631,604

(22) Filed: Apr. 10, 2024

(65) Prior Publication Data

US 2024/0255095 A1 Aug. 1, 2024

Related U.S. Application Data

(63) Continuation of application No. 17/840,174, filed on Jun. 14, 2022, now Pat. No. 11,959,583, which is a continuation of application No. PCT/US2020/066196, filed on Dec. 18, 2020.

(60) Provisional application No. 62/950,524, filed on Dec. 19, 2019.

(51) Int. Cl.
| | |
|---|---|
| *F16M 11/06* | (2006.01) |
| *A47F 5/08* | (2006.01) |
| *F16M 11/20* | (2006.01) |

(52) U.S. Cl.
CPC .............. *F16M 11/06* (2013.01); *A47F 5/08* (2013.01); *F16M 11/2007* (2013.01)

(58) Field of Classification Search
CPC .... F16M 11/06; F16M 11/10; F16M 11/2007; A47F 5/08
See application file for complete search history.

(56) References Cited

U.S. PATENT DOCUMENTS

| | | | |
|---|---|---|---|
| 2,090,439 A | 8/1937 | George |
| 2,630,854 A | 3/1953 | Paul |
| 3,490,727 A | 1/1970 | Miller |
| 4,076,351 A | 2/1978 | Wyant |

(Continued)

FOREIGN PATENT DOCUMENTS

| | | |
|---|---|---|
| CA | 3073367 A1 | 3/2019 |
| CN | 100411567 C | 8/2008 |

(Continued)

OTHER PUBLICATIONS

ISA, International Search Report and Written Opinion, PCT Patent Application PCT/US2020/066196, mailed Apr. 9, 2021, 13 pages.

(Continued)

*Primary Examiner* — Eret C McNichols
(74) *Attorney, Agent, or Firm* — Perkins Coie LLP

(57) ABSTRACT

A mounting system capable of mounting objects to support structures is disclosed. The mounting system includes a wall mount including a display bracket configured to hold the object, a fixed support bracket couplable to a vertical support structure, and a linkage assembly. The linkage assembly has a low-profile stowed configuration in which the object is held in a raised position close to the support structure. The linkage assembly moves to another configuration to move the object. The object can be held in a lowered position. A biasing mechanism can facilitate convenient movement of the object.

29 Claims, 15 Drawing Sheets

(56) References Cited

U.S. PATENT DOCUMENTS

| | | | |
|---|---|---|---|
| 4,082,244 A | 4/1978 | Groff |
| 4,561,674 A | 12/1985 | Alessio |
| 4,691,886 A | 9/1987 | Wendling et al. |
| 4,779,922 A | 10/1988 | Cooper |
| 4,781,375 A | 11/1988 | Nye |
| 4,852,500 A | 8/1989 | Ryburg et al. |
| 5,037,054 A | 8/1991 | Mcconnell |
| 5,101,736 A | 4/1992 | Bommarito et al. |
| 5,108,063 A | 4/1992 | Koerber et al. |
| 5,135,191 A | 8/1992 | Schmuhl |
| 5,224,677 A | 7/1993 | Close |
| 5,299,993 A | 4/1994 | Habing |
| 5,437,235 A | 8/1995 | Randolph |
| 5,499,956 A | 3/1996 | Habing et al. |
| 5,560,501 A | 10/1996 | Rupert |
| 5,738,316 A | 4/1998 | Sweere et al. |
| 5,743,503 A | 4/1998 | Voeller et al. |
| 5,826,846 A | 10/1998 | Buccieri et al. |
| 5,842,672 A | 12/1998 | Sweere et al. |
| 5,845,587 A | 12/1998 | Ditonto |
| 5,857,756 A | 1/1999 | Fehre |
| 5,876,008 A | 3/1999 | Sweere et al. |
| 5,909,934 A | 6/1999 | Mcgraw |
| 5,988,076 A | 11/1999 | Vander |
| 6,065,725 A | 5/2000 | Mason |
| 6,065,909 A | 5/2000 | Cook |
| 6,105,909 A | 8/2000 | Wirth et al. |
| 6,296,408 B1 | 10/2001 | Larkin et al. |
| 6,419,196 B1 | 7/2002 | Sweere et al. |
| 6,523,796 B2 | 2/2003 | Abramowsky et al. |
| 6,592,090 B1 | 7/2003 | Li |
| 6,695,274 B1 | 2/2004 | Chiu |
| 6,712,008 B1 | 3/2004 | Habenicht et al. |
| 6,889,404 B2 | 5/2005 | Lu et al. |
| 6,905,101 B1 | 6/2005 | Dittmer |
| 6,983,917 B2 | 1/2006 | Oddsen |
| 7,014,157 B2 | 3/2006 | Oddsen |
| 7,061,753 B2 | 6/2006 | Michoux et al. |
| 7,252,277 B2 | 8/2007 | Sweere et al. |
| 7,290,744 B2 | 11/2007 | Baldasari |
| 7,300,029 B2 | 11/2007 | Petrick et al. |
| 7,314,200 B2 | 1/2008 | Bally et al. |
| 7,345,870 B2 | 3/2008 | Shin |
| 7,395,996 B2 | 7/2008 | Dittmer |
| 7,398,950 B2 | 7/2008 | Hung |
| 7,431,254 B2 | 10/2008 | Cheng |
| 7,448,584 B2 | 11/2008 | Chen et al. |
| 7,494,099 B2 | 2/2009 | Shin |
| 7,546,745 B2 * | 6/2009 | Lee ...................... F25D 29/005 |
| | | 312/405.1 |
| 7,546,994 B2 | 6/2009 | Altonji et al. |
| 7,597,302 B2 | 10/2009 | Lee et al. |
| 7,640,866 B1 | 1/2010 | Schermerhorn |
| 7,663,868 B1 | 2/2010 | Lam |
| 7,721,658 B2 | 5/2010 | Seeley et al. |
| 7,770,856 B2 | 8/2010 | Depay |
| 7,789,363 B2 | 9/2010 | Duan |
| 7,823,973 B2 | 11/2010 | Dragusin |
| 7,841,567 B2 | 11/2010 | Wang |
| 7,854,415 B2 | 12/2010 | Holbrook et al. |
| 7,866,622 B2 | 1/2011 | Dittmer |
| 7,950,613 B2 | 5/2011 | Anderson et al. |
| 8,006,440 B2 | 8/2011 | Thomas et al. |
| 8,011,632 B2 | 9/2011 | Wang et al. |
| 8,051,782 B2 | 11/2011 | Nethken et al. |
| 8,061,663 B2 | 11/2011 | Wang et al. |
| 8,074,950 B2 | 12/2011 | Clary |
| 8,094,438 B2 | 1/2012 | Dittmer et al. |
| 8,201,792 B2 | 6/2012 | Yuan et al. |
| 8,333,355 B2 | 12/2012 | Stifal et al. |
| 8,382,052 B1 | 2/2013 | Mathieson et al. |
| 8,724,037 B1 | 5/2014 | Massey |
| 8,740,164 B2 | 6/2014 | Tachibana |
| 8,746,635 B2 | 6/2014 | Kim et al. |
| 8,783,193 B2 | 7/2014 | Scharing |
| 8,864,092 B2 | 10/2014 | Newville |
| 8,893,628 B2 | 11/2014 | Mckenzie et al. |
| 8,960,632 B2 | 2/2015 | Fallows |
| 9,004,430 B2 | 4/2015 | Conner |
| 9,016,648 B2 | 4/2015 | Smeenk |
| 9,121,543 B2 | 9/2015 | Dittmer et al. |
| 9,167,894 B2 | 10/2015 | Desroches et al. |
| 9,265,346 B1 | 2/2016 | Forney |
| 9,433,293 B2 | 9/2016 | Gross et al. |
| 9,470,357 B2 | 10/2016 | Hazzard et al. |
| 9,554,644 B2 | 1/2017 | Flaherty et al. |
| 9,581,285 B2 | 2/2017 | Ergun et al. |
| 9,625,091 B1 | 4/2017 | Massey |
| 9,720,444 B2 | 8/2017 | Holden |
| 9,820,571 B2 | 11/2017 | Lindbald |
| 9,876,984 B2 | 1/2018 | Massey |
| 9,907,396 B1 | 3/2018 | Labrosse et al. |
| 9,921,726 B1 | 3/2018 | Sculley et al. |
| 9,999,557 B2 | 6/2018 | Diaz-flores et al. |
| 10,038,952 B2 | 7/2018 | Labrosse et al. |
| 10,085,562 B1 | 10/2018 | Labrosse et al. |
| 10,139,045 B1 | 11/2018 | Keuter |
| 10,159,336 B2 | 12/2018 | Liao et al. |
| 10,257,460 B2 | 4/2019 | Massey |
| 10,277,860 B2 | 4/2019 | Massey |
| 10,281,080 B1 | 5/2019 | Massey |
| 10,285,297 B2 | 5/2019 | Bratcher et al. |
| 10,376,158 B2 | 8/2019 | Desroches |
| D879,514 S | 3/2020 | Goldberg et al. |
| 10,659,279 B2 | 5/2020 | Chiu et al. |
| 10,738,941 B2 | 8/2020 | Newville et al. |
| D895,325 S | 9/2020 | Goldberg et al. |
| 10,768,663 B2 | 9/2020 | Carson et al. |
| 10,827,829 B1 | 11/2020 | Labrosse et al. |
| 10,830,580 B2 | 11/2020 | Hodowany |
| 10,859,201 B2 | 12/2020 | Newville |
| 10,935,180 B1 | 3/2021 | Massey |
| 10,980,339 B2 | 4/2021 | Game et al. |
| 11,019,920 B2 | 6/2021 | Liao et al. |
| 11,033,107 B2 | 6/2021 | Warren |
| 11,051,611 B2 | 7/2021 | Goldberg et al. |
| 11,077,547 B2 | 8/2021 | Gosselin |
| 11,089,865 B2 | 8/2021 | Knapp et al. |
| 11,178,354 B2 | 11/2021 | Massey |
| 11,266,232 B2 | 3/2022 | Knapp et al. |
| 11,284,713 B2 | 3/2022 | Hazzard et al. |
| 11,287,080 B2 | 3/2022 | Newville et al. |
| 11,297,940 B2 | 4/2022 | Horn et al. |
| 11,346,493 B2 | 5/2022 | Massey |
| 11,346,496 B2 * | 5/2022 | Newville ............... F16M 13/02 |
| 11,357,323 B2 | 6/2022 | Nourse |
| 11,460,145 B2 | 10/2022 | Massey |
| 11,607,042 B1 | 3/2023 | Massey |
| 11,668,434 B2 | 6/2023 | Newville et al. |
| 11,692,666 B2 | 7/2023 | Patell |
| 11,774,033 B2 | 10/2023 | Massey |
| 11,781,702 B2 | 10/2023 | Massey |
| 11,781,703 B2 | 10/2023 | Massey |
| 11,802,653 B2 | 10/2023 | Newville et al. |
| 11,849,246 B1 | 12/2023 | Massey |
| 11,856,317 B2 | 12/2023 | Massey |
| 11,959,583 B2 | 4/2024 | Newville et al. |
| 12,022,941 B2 | 7/2024 | Hazzard et al. |
| 2002/0020329 A1 | 2/2002 | Kowalski |
| 2002/0033436 A1 | 3/2002 | Peng et al. |
| 2002/0043978 A1 | 4/2002 | Mcdonald |
| 2002/0100851 A1 | 8/2002 | Abramowsky et al. |
| 2002/0179791 A1 | 12/2002 | Kwon |
| 2004/0084587 A1 | 5/2004 | Oddsen |
| 2005/0010911 A1 | 1/2005 | Kim et al. |
| 2005/0022699 A1 | 2/2005 | Goza |
| 2005/0110911 A1 | 5/2005 | Childrey et al. |
| 2005/0152102 A1 | 7/2005 | Shin |
| 2005/0204645 A1 | 9/2005 | Bachinski et al. |
| 2005/0217540 A1 | 10/2005 | Novak |
| 2005/0236543 A1 | 10/2005 | Oneil |
| 2006/0065166 A1 | 3/2006 | Chi et al. |
| 2006/0070210 A1 | 4/2006 | Amdahl et al. |
| 2006/0077622 A1 | 4/2006 | Keely et al. |

(56) References Cited

U.S. PATENT DOCUMENTS

| | | |
|---|---|---|
| 2006/0102819 A1 | 5/2006 | Li |
| 2006/0284037 A1 | 12/2006 | Dittmer et al. |
| 2007/0007412 A1 | 1/2007 | Wang |
| 2007/0007413 A1 | 1/2007 | Jung et al. |
| 2007/0023599 A1 | 2/2007 | Fedewa |
| 2007/0030405 A1 | 2/2007 | Childrey et al. |
| 2007/0040084 A1 | 2/2007 | Sturman et al. |
| 2007/0205340 A1 | 9/2007 | Jung |
| 2007/0221807 A1 | 9/2007 | Park |
| 2007/0252056 A1 | 11/2007 | Novin |
| 2008/0078906 A1 | 4/2008 | Hung |
| 2008/0237424 A1 | 10/2008 | Clary |
| 2009/0032656 A1 | 2/2009 | Oh |
| 2009/0034178 A1 | 2/2009 | Le |
| 2009/0050757 A1 | 2/2009 | Oh et al. |
| 2009/0050763 A1 | 2/2009 | Dittmer |
| 2009/0108158 A1 | 4/2009 | Kim et al. |
| 2009/0166501 A1 | 7/2009 | Wang et al. |
| 2009/0179133 A1 | 7/2009 | Gan et al. |
| 2009/0206221 A1 | 8/2009 | Timm et al. |
| 2009/0212669 A1 | 8/2009 | Robert-reitman et al. |
| 2010/0006725 A1 | 1/2010 | Kim et al. |
| 2010/0024691 A1 | 2/2010 | Weber |
| 2010/0091438 A1 | 4/2010 | Dittmer |
| 2010/0123053 A1* | 5/2010 | Wang ............... F16M 11/24 |
| | | 248/122.1 |
| 2010/0123059 A1 | 5/2010 | Saez |
| 2010/0149736 A1 | 6/2010 | Dittmer et al. |
| 2010/0155558 A1 | 6/2010 | Zhang et al. |
| 2010/0171013 A1 | 7/2010 | Anderson et al. |
| 2010/0207006 A1 | 8/2010 | Kim |
| 2011/0043978 A1 | 2/2011 | Bremmon et al. |
| 2011/0108688 A1 | 5/2011 | Parruck |
| 2011/0198460 A1 | 8/2011 | Stifal et al. |
| 2011/0234926 A1 | 9/2011 | Smith |
| 2012/0032062 A1 | 2/2012 | Newville |
| 2012/0033371 A1* | 2/2012 | Pankros ............... F16M 11/10 |
| | | 248/231.91 |
| 2012/0061543 A1 | 3/2012 | Juan |
| 2012/0167486 A1 | 7/2012 | Lee |
| 2013/0032682 A1 | 2/2013 | Bell |
| 2013/0082156 A1 | 4/2013 | Conner |
| 2013/0176667 A1 | 7/2013 | Kulkarni et al. |
| 2013/0187019 A1 | 7/2013 | Dittmer et al. |
| 2013/0199420 A1 | 8/2013 | Hjelm |
| 2013/0221174 A1 | 8/2013 | Sapper et al. |
| 2013/0320163 A1 | 12/2013 | Wong |
| 2014/0208985 A1 | 7/2014 | Desroches et al. |
| 2014/0211100 A1 | 7/2014 | Massey |
| 2014/0311050 A1 | 10/2014 | Kincaid et al. |
| 2015/0138304 A1 | 5/2015 | Mcardell et al. |
| 2015/0245707 A1 | 9/2015 | Saab |
| 2015/0277214 A1 | 10/2015 | Schuh |
| 2016/0120309 A1 | 5/2016 | Brandt et al. |
| 2016/0270528 A1 | 9/2016 | Scharing |
| 2017/0105529 A1 | 4/2017 | Kozlowski et al. |
| 2017/0143117 A1 | 5/2017 | Koulizakis |
| 2018/0054156 A1 | 2/2018 | Lokey |
| 2018/0131895 A1 | 5/2018 | Massey |
| 2018/0310459 A1 | 11/2018 | Blunier |
| 2018/0352189 A1 | 12/2018 | Massey |
| 2019/0029414 A1 | 1/2019 | Nourse et al. |
| 2019/0059574 A1 | 2/2019 | Paul et al. |
| 2019/0072231 A1 | 3/2019 | Newville et al. |
| 2019/0309895 A1 | 10/2019 | Newville |
| 2019/0335135 A1 | 10/2019 | Massey |
| 2019/0343272 A1 | 11/2019 | Smith et al. |
| 2019/0374025 A1 | 12/2019 | Bowman |
| 2020/0022492 A1 | 1/2020 | Patrick et al. |
| 2020/0049304 A1 | 2/2020 | Hung |
| 2020/0355319 A1 | 11/2020 | Newville et al. |
| 2020/0390009 A1 | 12/2020 | Whitehead et al. |
| 2020/0408353 A1 | 12/2020 | Massey |
| 2021/0190259 A1 | 6/2021 | Newville |
| 2022/0150441 A1 | 5/2022 | Massey |
| 2022/0178493 A1 | 6/2022 | Seol et al. |
| 2022/0252209 A1 | 8/2022 | Newville |
| 2023/0016050 A1 | 1/2023 | Newville et al. |
| 2023/0016449 A1 | 1/2023 | Newville et al. |
| 2024/0027020 A1 | 1/2024 | Newville et al. |
| 2024/0125425 A1 | 4/2024 | Newville et al. |

FOREIGN PATENT DOCUMENTS

| | | |
|---|---|---|
| CN | 103371623 A | 10/2013 |
| CN | 104424849 A | 3/2015 |
| CN | 109605346 A | 4/2019 |
| CN | 111031859 A | 4/2020 |
| EP | 3662786 A1 | 6/2020 |
| GB | 2222939 A | 3/1990 |
| GB | 2579974 A | 7/2020 |
| JP | 2009014047 A | 1/2009 |
| KR | 100705069 B1 | 4/2007 |
| KR | 20070081731 A | 8/2007 |
| WO | 2019043670 A1 | 3/2019 |
| WO | 2019183822 A1 | 10/2019 |
| WO | 2021006987 A1 | 1/2021 |
| WO | 2021127552 A1 | 6/2021 |

OTHER PUBLICATIONS

ISA, International Search Report and Written Opinion, PCT Patent Application PCT/US2021/017141, mailed Jun. 1, 2021, 11 pages.

ISA, International Search Report and Written Opinion, PCT Patent Application PCT/US2021/017492, mailed Jun. 3, 2021, 17 pages.

MantelMount MM750 Pro Above Fireplace Pull Down TV Mount, accessed Dec. 3, 2020 from https://www.mantelmount.com/products/mm750-pro-pull-down-tv-mount, 6 pages.

MantelMount RB100 Recess Box—MantelMount Pull Down TV Mount Accessory, accessed Dec. 3, 2020 from https://www.mantelmount.com/products/mantelmount-rb100-recess-box, 6 pages.

ISA, International Preliminary Report on Patentability for International Application No. PCT/IB2018/57591. Mail Date: Mar. 10, 2020, 7 pages.

ISA, International Search Report and Written Opinion for International Application No. PCT/IB2018/57591, dated Jan. 28, 2019, 8 pages.

Patent Trial and Appeal Board of the United States Patent and Trademark Office, Petition for Post Grant Review of 11,781,703, *Lumi Legend Corporation* (Petitioner) v. *Manehu Product Alliance, LLC* (Patent Owner), Filed: Jan. 24, 2024, 172 pages.

Patent Trial and Appeal Board of the United States Patent and Trademark Office, Patent Owner's Preliminary Response, PTAB Case No. PGR2024-00014, *Lumi Legend Corporation* (Petitioner) v. *Manehu Product Alliance, LLC* (Patent Owner), May 8, 2024, 73 pages.

Patent Trial and Appeal Board of the United States Patent and Trademark Office, Decision Granting Institution of Post Grant Review, PTAB Case No. PGR2024-00014, *Lumi Legend Corporation* (Petitioner) v. *Manehu Product Alliance, LLC* (Patent Owner), Aug. 5, 2024, 30 pages.

* cited by examiner

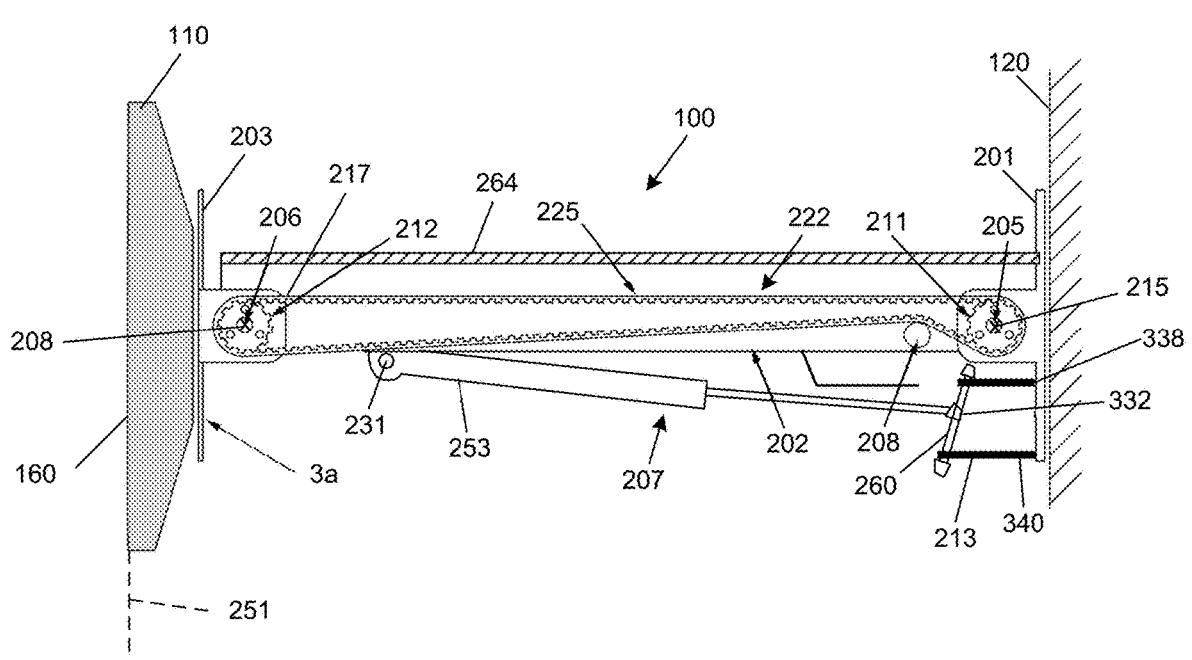
*FIG. 3*
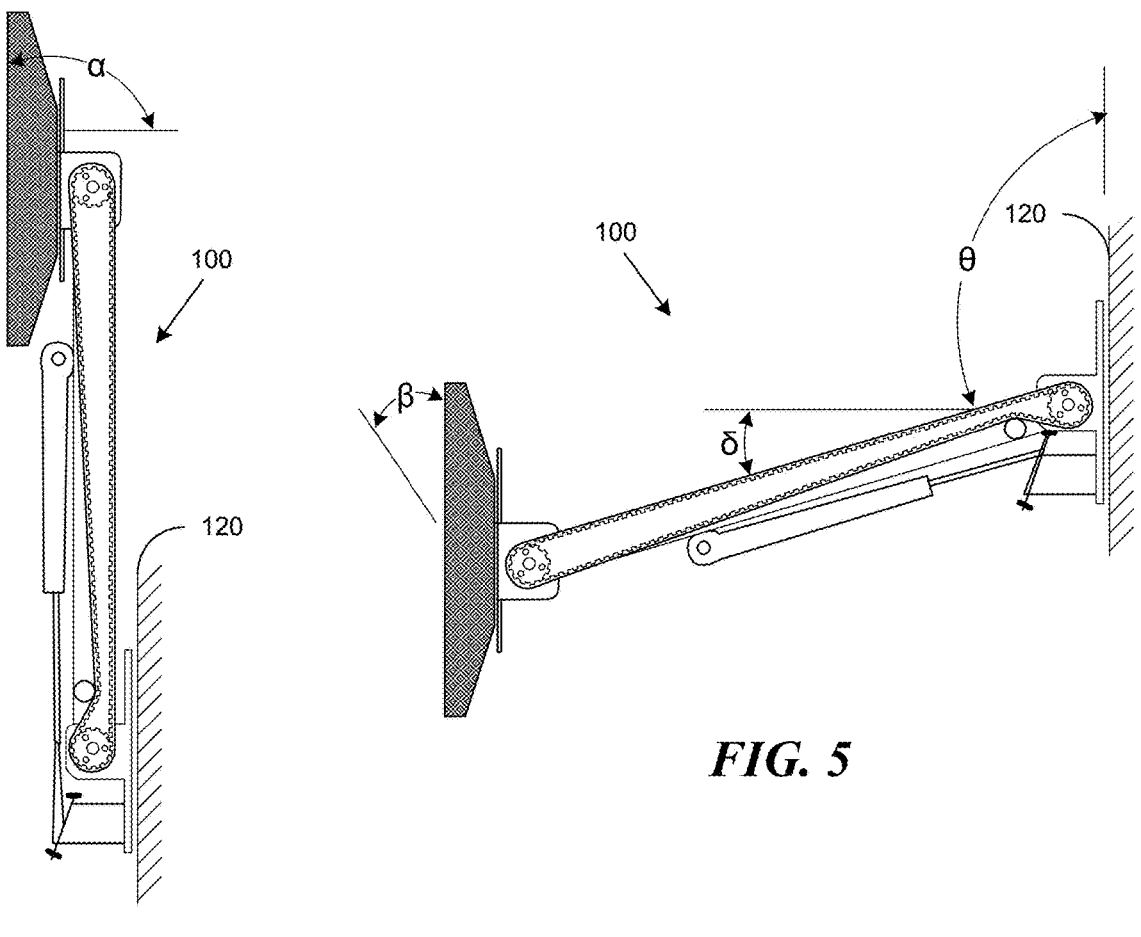
*FIG. 4*
*FIG. 5*

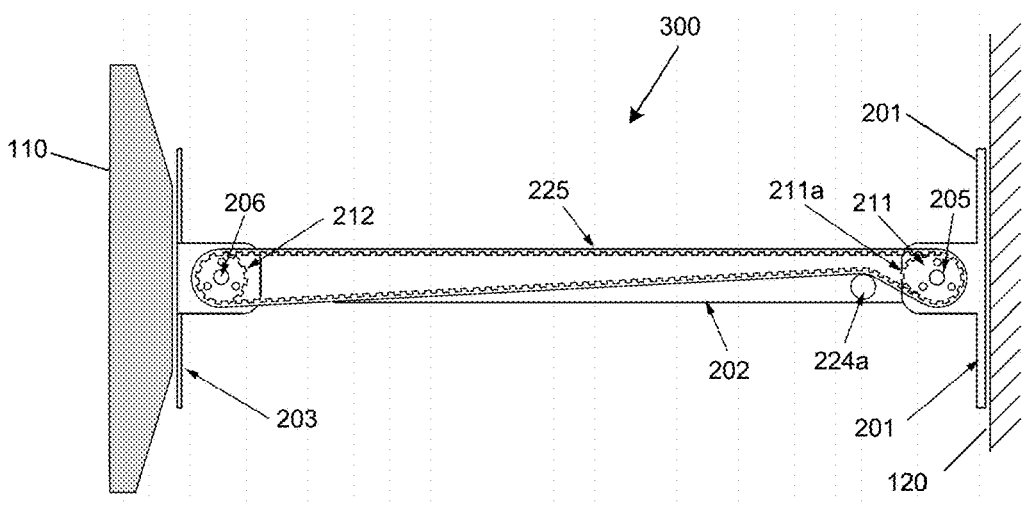
FIG. 12
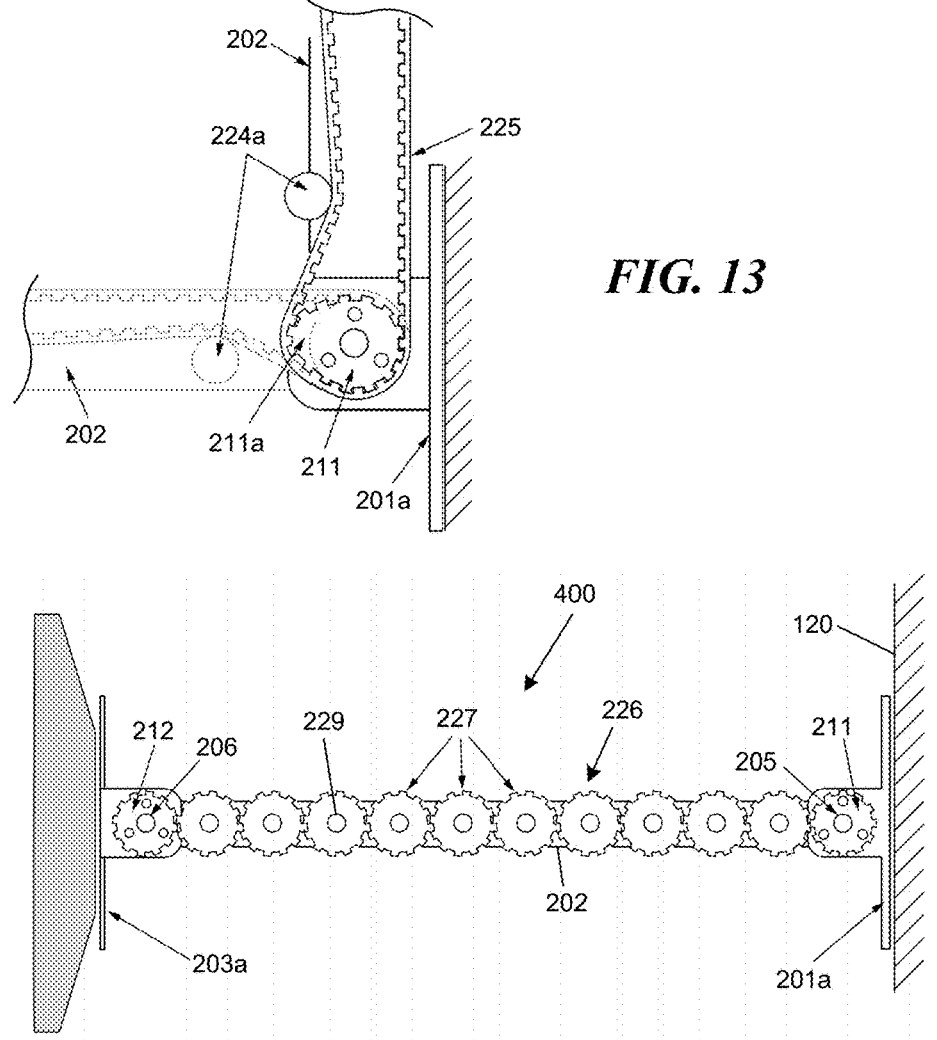
FIG. 13
FIG. 14

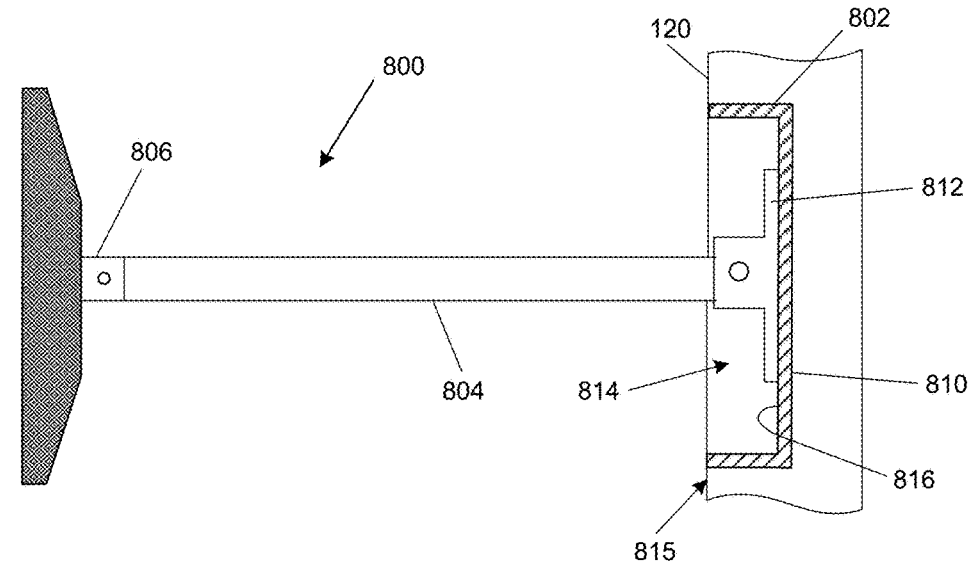
FIG. 24
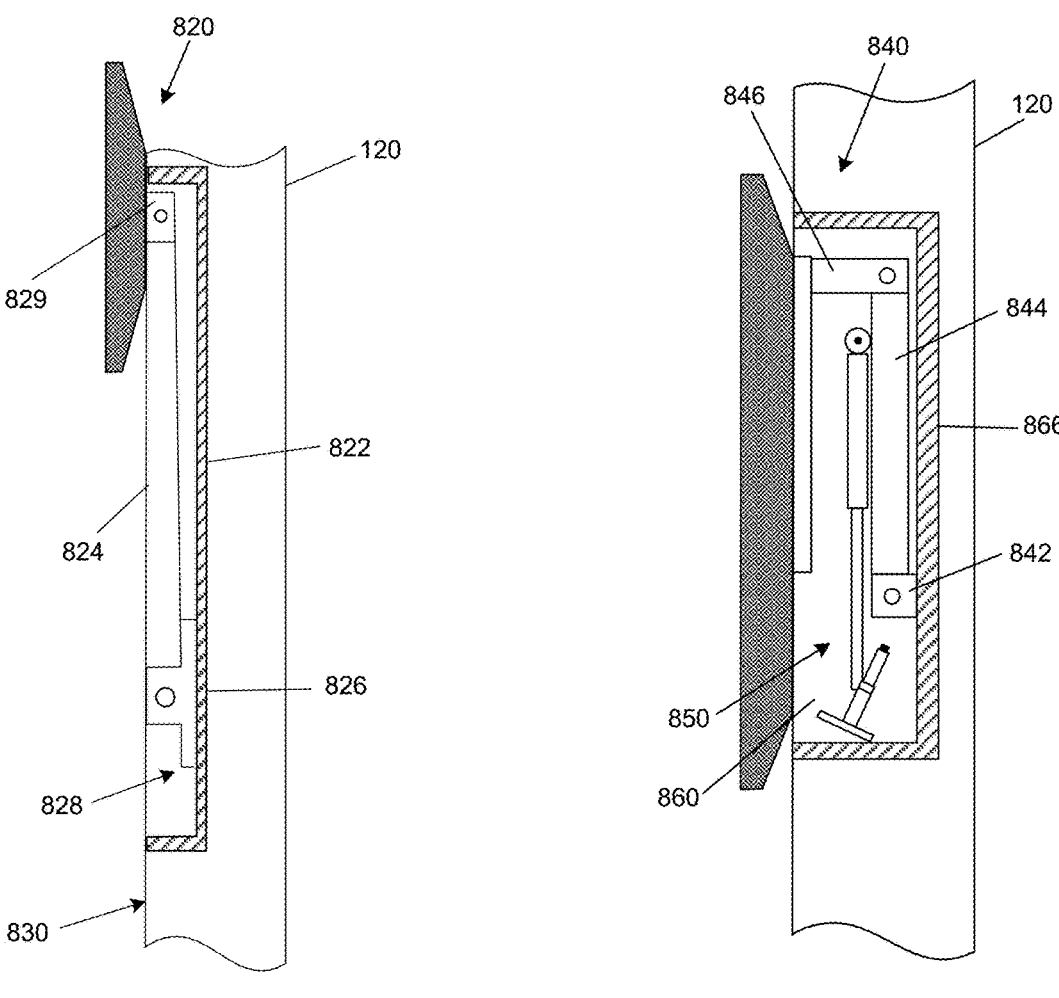
FIG. 25
FIG. 26

ADJUSTABLE DISPLAY MOUNTING SYSTEM

CROSS-REFERENCE TO RELATED APPLICATIONS

The present application is a is a continuation of U.S. application Ser. No. 17/840,174, filed Jun. 14, 2022, which is a continuation of International Application No. PCT/US20/66196, filed Dec. 18, 2020, which claims the benefit under 35 U.S.C. § 119(e) of U.S. Provisional Patent Application No. 62/950,524, filed Dec. 19, 2019, which are incorporated herein by reference in their entireties.

TECHNICAL FIELD

The present invention relates generally to mounting systems. More specifically, the invention relates to display mounting systems for mounting displays to structures.

BACKGROUND

Televisions are often mounted directly to walls using wall mounts. Tilting wall mounts, horizontal motion wall mounts, and four-bar linkage wall mounts allow movement of the television. Tilting wall mounts often allow tilting about a horizontal axis of rotation. Unfortunately, if tilting wall mounts are installed at relatively high locations, there may be limited viewing because ideal viewing often requires that the center of the screen be level with a viewer's eyes. Horizontal motion wall mounts often allow movement of the television away from walls, swiveling of the television, and/or tilting of the television. If either a tilting wall mount or four-bar linkage wall mount is installed above a fireplace, the mounted television is often much higher than a sitting viewer's eyes and, thus, may not provide comfortable viewing. Conventional four-bar linkage television wall mounts can be used to raise and lower televisions. Unfortunately, lower linkages of four-bar linkages move away from upper linkages and can contact mantels or other structures below the wall mounts, thereby limiting the range of motion. Additionally, cables can be pinched and damaged by the moving linkages. Accordingly, there is a need for improved mounts capable of moving televisions.

SUMMARY

In some embodiments, a television mounting device includes a mounting bracket, a television bracket, and an arm. The mounting bracket can be configured to be mounted on a wall. The television bracket is configured to hold a television. The arm has a first end rotatably coupled to the mounting bracket and a second end rotatably coupled to the television bracket. The television mounting device further includes an indexed drive assembly configured to provide target positioning of the television bracket when the arm is moved between different positions. In some embodiments, the indexed drive assembly is coupled to the television bracket and positions the television bracket at a targeted position when the arm is moved between a first position (e.g., a raised position) and a second position (e.g., a lowered position). In manually operated embodiments, a user can pull or push the television bracket to a target height. In motorized embodiments, the television mounting device can include one or more motors that operate to position the television bracket at the target height.

The indexed drive assembly can be configured to cause a television bracket to be positioned below at least a portion of the mounting bracket when the arm is at the lowered position. The drive assembly can include a plurality of indexers that cooperate to define predetermined positions relative to a reference component or point. The indexers can be connected by one or more idle gears, flexible connectors, worm gears, rack and pinion assemblies, or other drive assemblies. In some embodiments, the indexers are enmeshed with a flexible connector so as to define the target positioning. The drive assembly can rotationally fix a television bracket to the mounting bracket or other stationary component mounted to the wall. The mounting bracket can be mounted on an exterior of the wall, embedded in the wall, or completely hidden within the wall. In some embodiments, the drive assembly rotationally fixes the television bracket to a stationary component to hold the television when the arm moved.

The drive assembly can move the television bracket to preset positions and includes a first indexer connected to the mounting bracket, a second indexer connected to the television bracket, and a flexible member engaging the first and second indexers to synchronize (1) rotation of the television bracket relative to the arm with (2) rotation of the arm relative to the mounting bracket. Advantageously, the positioning allows a user to move the television bracket to preset positions without having to recalibrate the television mounting device. The first indexer can be rotationally and translationally fixed to the mounting bracket. The second indexer can be rotationally and translationally fixed to the television bracket. The flexible member can maintain the rotational relationship between the first and second indexers during use. In some embodiments, the flexible member is a drive belt.

In motorized television mounting devices, the drive assembly can include a first motor, a second motor, and a controller. The controller can be programmed to command the first and second motors to coordinate motion between components, such as motion of the arm and motion of the television mounting bracket. The controller can be programmed with indexing, indexing maps, and other data for operating the motors to provide controlled movement of components. The first motor can be coupled to the arm and engage a first gear coupled to the television bracket. The second motor can engage a second gear coupled to the mounting bracket. The controller can communicate wirelessly or via a wired connection with the first and second motors. The first and second motors can be coupled to a power supply, such as a battery, an AC outlet, or another power source.

In some embodiments, a television mounting device includes a mounting bracket, a television bracket, an arm, and a drive assembly. The arm is rotatably coupled to the mounting bracket and rotatably coupled to the television bracket. The drive assembly is rotationally fixed to the television bracket and configured to cause rotation of the television bracket relative to the arm when the arm is moved between positions. The drive assembly can include at least one indexer, gear, sprocket, indexing element, or other discrete positioning element fixed to the television bracket. The drive assembly can hold the television bracket rotationally fixed (e.g., via a non-rotatable connection) relative to a stationary indexer such that movement of the arm relative to the stationary indexer causes the drive element to rotationally hold the television bracket throughout at least a portion of the television mounting device reconfiguration. In certain embodiments, the television bracket can be held at a tilt position when the television bracket is moved between a raised position and a lowered position. In other embodiments, the television bracket can be rotated between predetermined positions when moved vertically. The drive assembly can gradually rotate the television bracket based on the geometry of the television mounting device. For example, the television bracket can gradually be moved from a first tilt position to a second tilt position as the television bracket is lowered, thereby allowing the television bracket to position the television at target viewed heights for different lines of sight.

In some further embodiments, a display mounting device includes a mounting bracket, a display bracket, and an arm. The mounting bracket can be configured to be mounted on a wall. The display bracket is configured to hold a display. The display mounting device further includes a tilt orienting assembly configured to provide target positioning of the display bracket when the arm is moved between different positions. The tilt orienting assembly can include one or more indexers, connectors, and torque balancing elements. In some embodiments, the tilt orienting assembly operates as a moment countering drive for applying torques. In some embodiments, the tilt orienting assembly is coupled to the display bracket and positions the display bracket at a targeted position when the arm is moved between a first position (e.g., a raised position) and a second position (e.g., a lowered position).

In some embodiments, a system includes a display bracket configured to hold a television, a support bracket, and an arm (e.g., a one-piece arm, a multi-piece arm, etc.) or linkage assembly rotatably coupled to the display bracket and the support bracket. In swing-arm embodiments, the arm can have two pivots or axes of rotation at opposing ends. The system can be configured to operate as a two-bar linkage, three-bar linkage, or other linkage mechanism. In linkage systems, the linkage assembly has a collapsed upright configuration for holding the display bracket at the raised position and an expanded configuration for holding the display bracket at the lowered position. In some embodiments, the system can include a motorized actuator operable to cause the linkage assembly to raise and lower the display bracket. The system can include a motorized swivel operable to swivel the television.

In some further embodiments, a motorized television system includes a television holder assembly configured to hold a television, a mounting assembly, and an arm assembly. The arm assembly includes an arm pivotally coupled to the television holder assembly and the mounting assembly. The arm assembly is operable to move the television holder assembly between a raised position and a lowered position. At least a portion of the television holder assembly is lower than the mounting assembly when the television holder assembly is at the lowered position. In some embodiments, the mounting system includes a swivel mechanism that swivels a television relative to the arm assembly.

In yet further embodiments, a system includes a low-profile wall mount including a display bracket configured to carry a television a support bracket configured to couple to a wall, and a linkage or arm assembly rotatably coupled to the display bracket and rotatably coupled to the support bracket. The system further includes a biasing mechanism configured to counterbalance the weight of large television screens. The biasing mechanism includes a force balancing device and a force adjusting mechanism. The force adjusting mechanism is operable to change the configuration of the force balancing device to increase or decrease a balancing force to counterbalance weights of different televisions. The force adjustment mechanism can include at least one threaded member, carriage, slider, force adjuster, etc. The threaded member can be rotated to drive the carriage so as to contract or extend the biasing mechanism (e.g., gas spring, piston, etc.) when the carriage moves along the threaded member.

In some embodiments, a device comprises a wall mounting portion, an extending portion, and a television mounting portion. The wall mounting portion is coupled to the extending portion. The extending portion is rotatably attached to the television mounting portion and positions a television portion down and away from the wall mounting portion (e.g., an extended configuration). The extending portion positions a television mounting portion up and towards the wall mounting portion (e.g., a retracted configuration). The extending portion comprises an arm, at least one gas spring, a spring block, a calibration screw, an adjustment screw, and an adjustment collar. The spring block moves vertically when the calibration screw rotates such that the one gas spring is connected a spring block so as to provide adjustment. In some embodiments, the adjustment screw directly engages and moves into contact with the arm. The television mounting portion comprises a handle with a temperature element (e.g., temperature sensor, gauge, etc.).

In some embodiments, a television mounting device includes a television holder and an arm. The arm has a first end rotatably couplable to a support structure and a second end rotatably coupled to the television holder. The television mounting device further includes a rotational locking assembly configured to provide target positioning of the television holder when the arm is moved between different positions. In some embodiments, the rotational locking assembly is coupled to the television holder (e.g., a television bracket) and positions the television holder at a targeted position when the arm is moved between a first position (e.g., a raised position) and a second position (e.g., a lowered position).

In some embodiments, a television mounting device includes a mounting bracket, a television bracket, and an arm. The mounting bracket can be configured to be mounted on a wall. The television bracket is configured to hold a television. The arm has a first end rotatably coupled to the mounting bracket and a second end rotatably coupled to the television bracket. The television mounting device further includes a means for positioning of the television bracket when the arm is moved between different positions. In some embodiments, the means for positioning is coupled to the television bracket and positions the television bracket at a targeted position when the arm is moved between a first position (e.g., a raised position) and a second position (e.g., a lowered position). In manually operated embodiments, a user can pull or push the television bracket to a target height. In motorized embodiments, the television mounting device can include one or more motors that operate to position the television bracket at the target height. The means for positioning can include one or more indexed drive assemblies, tilt drive assemblies, tilt orienting assembly, or the like.

BRIEF DESCRIPTION OF THE DRAWINGS

FIG. 3 is a side view of a manually operated television mounting device of FIG. 1 with an arm in a horizontal position in accordance with an embodiment of the technology.

FIG. 4 shows the television mounting device in a raised position adjacent to a wall.

FIG. 5 shows the television mounting device in a lowered position.

FIG. 12 is a side view of a manual television mounting device in accordance with embodiments of the technology.

FIG. 13 is a detailed view of a mounting bracket and an end of an arm of the television mounting device of FIG. 12.

FIG. 14 is a side view of a television mounting device with a gear drive train in accordance with embodiments of the technology.

FIG. 24 is a side view of a partially recessed television mounting device in accordance with embodiments of the technology.

FIGS. 25 and 26 are side views of recessed television mounting devices in raised positions in accordance with embodiments of technology.

DETAILED DESCRIPTION

Figures 1, 2:
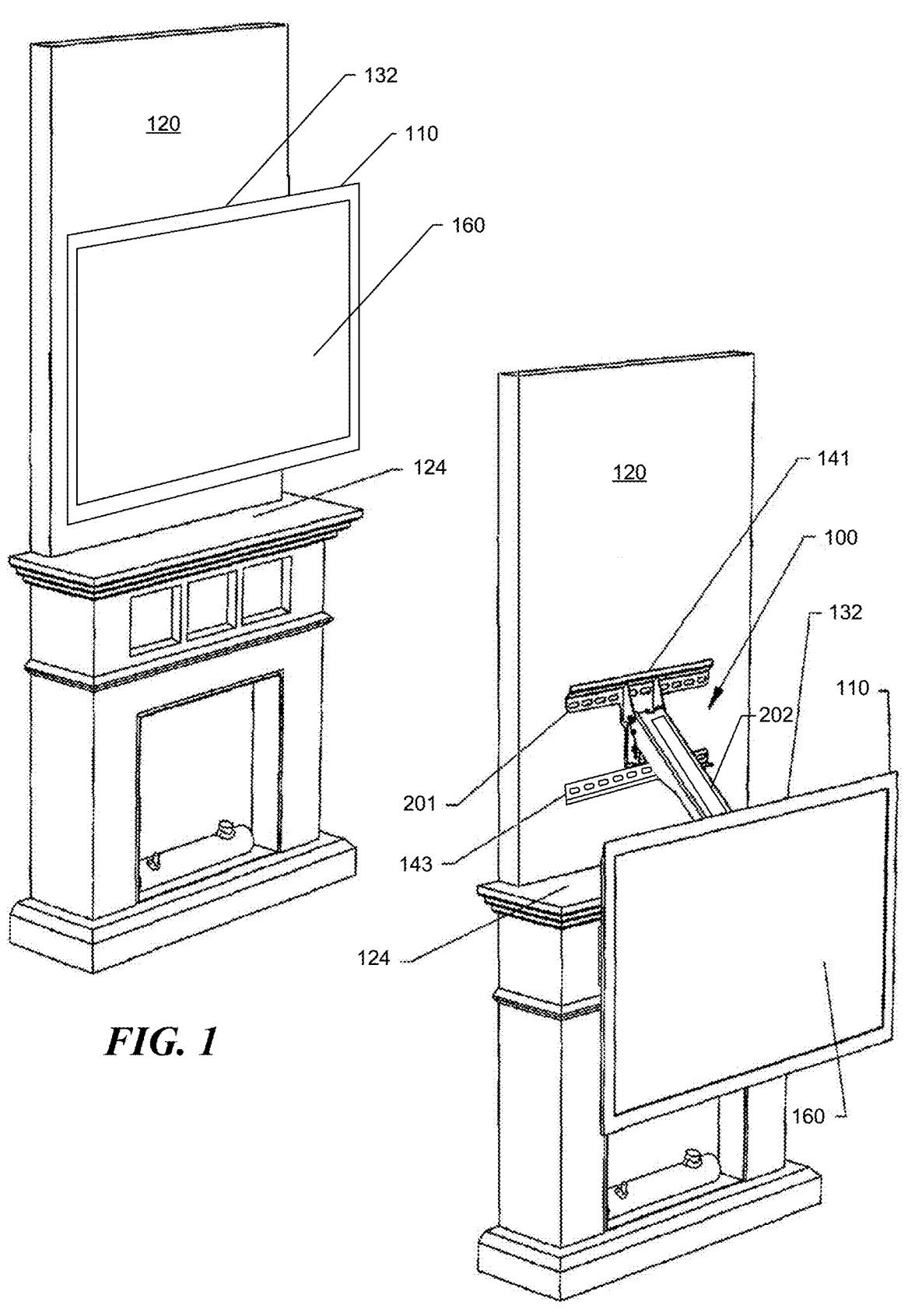
FIG. 1 is a pictorial view of a television installed above a fireplace.
FIG. 2 shows the television of FIG. 1 in a lowered position in front of the fireplace.

FIG. 1 shows a display or television 110 ("television 110") in a raised, stowed position and very close to a wall 120. FIG. 2 shows the television 110 in a lowered, deployed position and in front of the fireplace. Referring now to FIG. 1, the stowed television 110 is positioned above a fireplace to avoid occupying usable space and to reduce the likelihood of unwanted inadvertent contact by people moving about the room. If the fireplace includes a hearth, it may be difficult for small children, or other individuals, to inadvertently contact the television 110. The television 110 can be generally flat against or parallel to the wall 120 (e.g., parallel to the wall 120) to minimize or limit unwanted reflections from a screen 160 that may be directed to someone sitting on furniture in front of the television 110, especially when the television 110 is turned off. The raised television 110 can swing downwardly and, if desired, can be positioned in front of the fireplace, as shown in FIG. 2. A television mounting device 100 ("mounting device 100"), which is visible in FIG. 2, can be hidden from view of someone in front of the television 110 for an aesthetically pleasing appearance. The lowered television 110 is especially well suited for viewing when someone is positioned near the television 110, for example, to play a game system (e.g., Xbox 360, PlayStation®, PlayStation®2, PlayStation 3, Nintendo game system, or the like), or to provide convenient viewing while sitting, for example, on furniture or on the floor. After viewing, the television 110 can be returned to the stowed position.

Referring now to FIG. 2, a top 132 of the stowed television 110 can be lower than most or all of a mounting bracket 201, and the screen 160 can be substantially perpendicular to a sitting viewer's line of sight, substantially parallel to a front surface of the wall 120, or at another desired orientation. For example, the top 132 of the lowered television 110 can be lower than a top 141 and/or a bottom 143 of the mounting bracket 201. The mounting device 100 can automatically move (e.g., raise/lower, swivel, and/or tilt) the television 110. As the television 110 is lowered, the mounting device 100 can automatically rotate the television relative to an arm 202 to keep the screen 160, for example, substantially perpendicular relative to the viewer's line of sight, substantially parallel to the wall 120, etc. Once the television 110 is at a desired position, the television 110 can be further tilted, swiveled, panned, etc.

In some motorized embodiments, the mounting device 100 can include motorized swivel mechanisms, swivel/tilting mechanisms, drive motors, or the like to provide motorized positioning and can include one or more controllers, such as the controller discussed in connection with FIG. 29. The positioning capabilities of the mounting device 100 can be selected based on target viewing positions.

In some manually operated embodiments, a user can conveniently grasp and pull the television 110 away from the wall 120. The bottom of the television 110 can automatically swing away from the wall 120 to keep the television 110 from striking the top of a mantel 124. After the bottom of the television 110 has moved forwardly past the mantel 124, the television 110 can be lowered downwardly past the top surface of the mantel 124. In this manner, the television 110 can be brought down and in front of the mantel 124 or any other protruding object below the mounting bracket 201. One or more adjustable fixed stops can be used to prevent contact with the mantel 124 or to achieve repeatable positioning, or both. The fixed stops can be incorporated into the arm 202, mounting bracket 201, or any other components of the mounting device 100. The mounting device 100 can include one or more drive trains, pulley systems, gear systems, motors, indexers, sprockets, belts, chains, or combinations for moving the television.

The mounting device 100 can be coupled to a wide range of different types of support structures, such as walls of a dwelling (e.g., a house, an apartment, etc.), an office, a lobby, a bar (e.g., sports bar), restaurant, or the like and can be mounted to vertical walls or non-vertical walls, including, without limitation, angled walls, non-planar walls, or other structures sturdy enough to handle the load of the mounting device 100 and any attached object(s). The mounting bracket 201 can be configured to be mounted to a surface of the wall. In some embodiments, the mounting bracket 201 can be configured to be positioned at least partially within the wall. For example, the mounting bracket 201 can be mounted to the sides of studs or other structural elements within or inset in the wall. At least a portion of the arm 202 can be positioned within the wall 120 and surrounded by the recessed mounting bracket 201. In some embodiments, the entire mounting bracket 201 is positioned within the wall 120. The arm 202 can include a first end 215 rotatably coupled to the mounting bracket 201 and an opposing second end 217 rotationally coupled to a display or television bracket 203 ("television bracket 203"). The configuration, dimensions, and functionality of the mounting bracket 201, the arm 202, and the mounting bracket 201 can be selected based on the desired installation location, paths of travel of the television 110, a range of motion of the television 110, or the like. Example mounting arrangements and positioning of mounting device 100 are discussed in connection with FIGS. 24-26.

The television 110 can be, without limitation, a liquid crystal display (LCD) television, a plasma television, a light emitting diode (LED) television, or other type of flat-screen television, as well as other types of wall-mountable televisions. The weights of such televisions are often in a range of about 20 pounds to about 110 pounds and often have a maximum thickness less than about 5 inches. Advantageously, large screen televisions have a screen with a length (measured diagonally) equal to or greater than about 30 inches, 50 inches, 60 inches, 70 inches, 80 inches, etc., and can hide the entire mounting device 100, as shown in FIG. 2. The mounting device 100 can also hold small or medium screen televisions. Other types of electronic displays (e.g., monitors) or objects can be carried by the mounting device 100. Exemplary mountable objects include, but are not limited to, screens suitable for use with front projectors, boards (e.g., a chalk board, a dry erase board, etc.), containers (e.g., a basket, a bin, etc.), or the like.

FIG. 3 is a side view of the mounting device 100 with the arm 202 in a substantially horizontal position in accordance with embodiments of the technology. FIG. 4 shows the mounting device 100 in a raised position adjacent to the wall 120. FIG. 5 shows the mounting device 100 angled downwardly in a lowered position. Referring now to FIG. 3, a user can manually move the television 110 between a raised position (FIG. 4) and a lowered position (FIG. 5). The arm 202 can function as a single-bar linkage pinned to the mounting bracket 201 and the television mounting bracket 203 to provide a relative low profile for enhanced range of motion as compared to, for example, four-bar or five-bar linkages. The configuration and operation of the arm 202 can be selected based on the range of motion.

A drive assembly 222 can interconnect movable components such that the television 110 is automatically positioned due to relative movement between components. One or more positional relationships (e.g., angular positions, rotational speeds, etc.) between two or more components can be maintained or controlled to position the television 110. In some embodiments, the drive assembly 222 can synchronize rotation of the television mounting bracket 203 with rotation of another component of the mounting device 100, such as the arm 202. For example, rotation of the arm 202 relative to the mounting bracket 201 can cause rotation of the television mounting bracket 203.

In some embodiments, the drive assembly 222 can securely hold and rotate the mounting bracket 203, which can be a single-pivot bracket. The drive assembly 222 can include, for example, indexers that cooperate to define discrete positions for the mounting bracket 203. The indexers can enmesh one another. For example, the drive assembly 222 can operate to hold the mounting bracket 203 at a vertical position while the arm 202 is rotated upwardly and downwardly. In some embodiments, the drive assembly 222 is a tilt inhibiting/arresting drive, which is linked to other components. The tilt inhibiting/arresting drive can be configured to keep the mounting bracket 203 at a particular orientation. Advantageously, the mounting device 100 can be reconfigured any number of times without recalibration due to the mechanical engagement between components.

Figure 8:
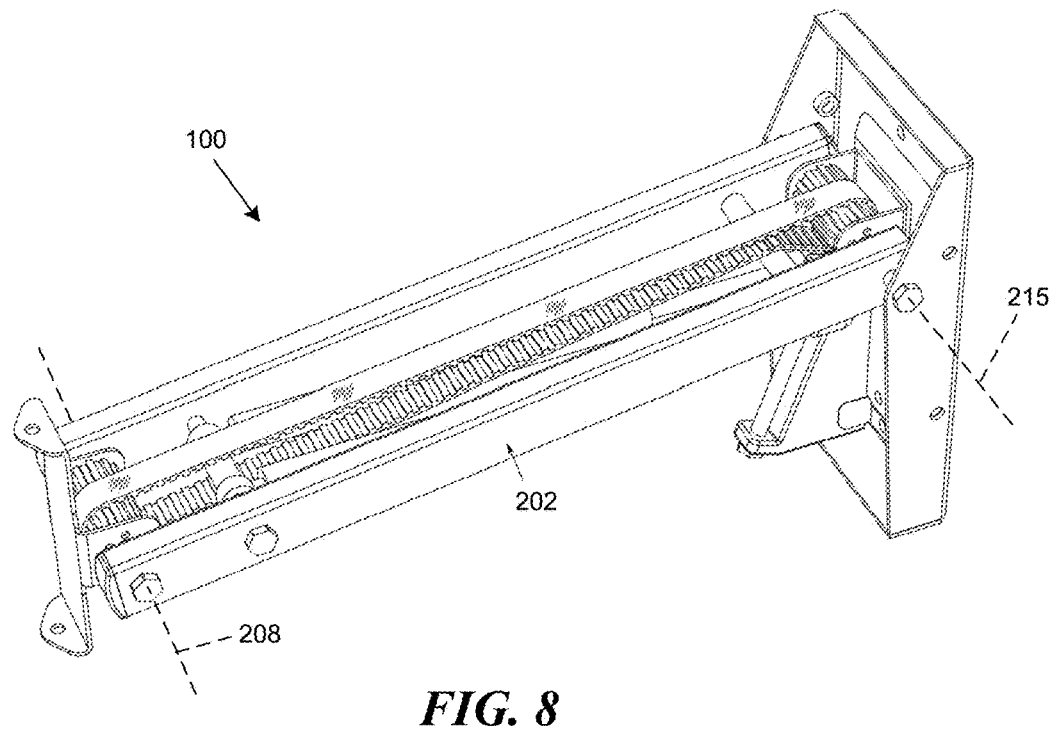
FIGS. 8-11 show components of the television mounting device of FIG. 7 in accordance with embodiments of the technology.

A pin or pivot 206 can pivotally couple the television mounting bracket 203 to the arm 202. A pin or pivot 205 can pivotally couple the arm 202 to the bracket 201. In some embodiments, the rotational speed of the television mounting bracket 203 relative to an axis of rotation 208 (see FIG. 8) defined by the pin 206 can be proportional or equal to the rotational speed of the arm 202 relative to an axis of rotation 215 (see FIG. 8) defined by the pin 205. In some embodiments, an angle of rotation of the television mounting bracket 203 about the axis of rotation 208 can be proportional or equal to an angle of rotation of the arm 202 about the axis of rotation 215. The television 110 can be kept parallel to a reference plane, such as a vertical plane 251 (indicated in dashed line in FIG. 3) parallel to the wall 120 or another plane. In one embodiment, the screen 160 of the television 110 can be kept substantially vertical at an angle between about 0 degrees and 5 degrees from vertical, such as angles less than 5 degrees, 4 degrees, 3 degrees, 2 degrees, or 1 degree from the vertical plane 251, thus substantially preventing tilting of the television 110. In some embodiments, a ratio of (1) an angle of rotation of the TV mounting bracket 203 relative to the arm 202 to (2) the angle of rotation of the arm 202 to the mounting bracket 201 can be 0.8, 0.9, 1, 1.1, 1.2, or ranges encompassing such ratios, during most or substantially all of the travel of the television 110. If the television 110 is mounted above a fireplace, the arm 202 can rotate about the axis of rotation 215 an angle θ (FIG. 5) in a range of about 90 degrees to about 160 degrees. Other angles are also possible, if needed or desired.

Referring now to FIGS. 3 and 4, the television mounting bracket 203 rotates counterclockwise relative to the arm 202 an angle α (see FIG. 4) when the arm 202 moves from the partially or fully lowered position to a raised or vertical position. Angle α can be from the screen of the television 110 to a plane generally perpendicular to a longitudinal axis (see longitudinal axis 213 of FIG. 6) of the arm 202. Referring now to FIGS. 3 and 5, the television mounting bracket 203 can rotate clockwise an angle α (see FIG. 5) of about 0 degree, 5 degrees, 10 degrees, 15 degrees, 20 degrees, or 30 degrees when the arm 202 is moved from the raised position to a lowered position. Referring now to FIG. 5, an angle of declination δ (FIG. 5) of the lowered arm 202 can be in a range of about 5 degrees to about 80 degrees, 5 degrees to about 70 degrees, 5 degrees to about 50 degrees, or other suitable ranges. If the mounting device 100 is positioned above a mantel, the maximum angle of angle of declination can be about 40 degrees, 50 degrees, or 60 degrees. Other angles are also possible. The configuration of the drive assembly 222 can be selected based on a desired positional relationship between mount components.

Referring again to FIG. 3, the drive assembly 222 can include one or more indexers 211, 212 and a flexible connector 225. The indexers 211, 212 can be fixed (e.g., rotationally fixed, translationally fixed, etc.) to the brackets 201, 203, respectively, using temporary or permanent attachment features, such as non-rotational connections or screws through holes discussed in connection FIG. 6. In some embodiments, the indexers 211, 212 are fixedly connected (e.g., non-rotatably connected) via welding or bonding to the brackets 201, 203, respectively. The flexible connector 225 can be a belt (e.g., a timing belt, a drive belt, an endless belt, etc.), a chain, or a flexible component that mechanically connects the indexers 211, 212. In some embodiments, the connector 225 is a timing belt configured such that the indexer 212 communicates directly with indexer 211. The timing belt 225 can be installed on the indexers 211, 212 when the television bracket 203 is at the desired orientation, thereby setting a positional relationship between brackets 201, 203. The torque applied to the indexer 212 can be about the axis of rotation 208, thereby rotating the television mounting bracket 203 without using a separate pinned connection. As such, the television mounting bracket 203 can operate as a single pivot bracket. Advantageously, the connector 225 can maintain the orientation of the television mounting bracket 203 throughout use without recalibration. A user can remove and reinstall the connector 225 any number of times to adjust the positioning of the television mounting bracket 203, thereby providing installation flexibility.

The indexers 211, 212 can be gears, pulleys (e.g., toothed pulleys), or sprockets and can have the same number of teeth such that the TV mounting bracket 203 and the arm 202 rotate in unison (e.g., rotate at the same rotational speed). The flexible connector 225 can apply a force (e.g., moment, torque, etc.) to the television mounting bracket 203 via the indexer 212 to hold the television at a target orientation. The vertical orientation of the television bracket can be maintained when the television bracket is moved vertically. In some embodiments, the indexers 211, 212 can have different numbers of teeth such that the TV mounting bracket 203 rotates relative to the arm 202 and mounting bracket 201 at different speeds. The configuration of the indexers 211, 212 can be selected based on a target mechanical advantage, a gear or velocity ratio (e.g., ratio of a diameter of driver indexer 211 to a diameter of driven indexer 212), output speed, output torque, or the like. An optional idler pulley 208 can engage the belt 225 and can be pivotally coupled to the arm 202.

As the mounting device 100 is manually raised or lowered, the belt 225 can engage the indexer 212 to maintain the same rotational alignment as the stationary indexer 211. The rotational position of the indexers 211, 212 can be such that the TV mounting bracket 203 remains substantially parallel to the wall surface 120. In the illustrated embodiment, the screen of the television 110 can be held at a substantially vertical orientation throughout travel of the mounting device 100, as shown in FIGS. 3-5. The drive assembly 222 can be positioned alongside the arm 202 to reduce the profile of the deployed mounting device 100 and provide more downward travel than, for example, four-bar linage mounts with linkages that move away from one another. An optional covering 254 (shown in cross section in FIG. 3) can protect the internal moving components and can be carried by the arm 202.

FIG. 3 also shows the mounting device 100 including a counterbalancing mechanism 207 coupled to the arm 202 and mounting bracket 201. The counterbalancing mechanism 207 can include one or more gas springs, pistons, mechanical or motorized force adjustment devices, or combinations thereof. In some embodiments, the counterbalance mechanism 207 includes a biasing device 209 rotatably coupled to the arm 202 by a pivot 231 and coupled to a force adjustment device 213. The force adjustment device 213 can be similar to or include features of the counterbalancing mechanisms, adjuster mechanisms, or other features or technologies disclosed in U.S. Pat. No. 8,724,037, which is incorporated by reference in its entirety. The biasing device

209 can include one or more gas pistons, pneumatic pistons, springs (e.g., helical springs, compression springs, etc.), or other types of biasing devices capable of providing a desired force, including, without limitation, a substantially constant force, variable force, or the like. In other embodiments, pins, stops, or other features can be used to hold the arm 202 at a desired position.

The force adjustment device 213 can include a threaded rod 260 held by holders 338, 340 of the mounting bracket 201. The rod 260 can be rotated to move a carriage or block 332 upwardly or downwardly. The carriage 332 is rotatably coupled to the counterbalance mechanism 207 and can be in a first position such that the counterbalance mechanism 207 is in a first setting or configuration to provide a first balancing force. The carriage 332 can be moved to a second position such that the counterbalance mechanism 207 is in a second setting or configuration to provide a second balancing force that is substantially different from the first balancing force. For example, the first balancing force can counterbalance a television that weighs about 100 pounds wherein the second balancing force can counterbalance a television that weighs about 40 pounds. Other types of force adjustment mechanisms can include, without limitation, one or more motors (e.g., stepper motors, drive motors, etc.), rails, linear slides, threaded rods, pulleys, combinations thereof, or the like.

Figure 6:
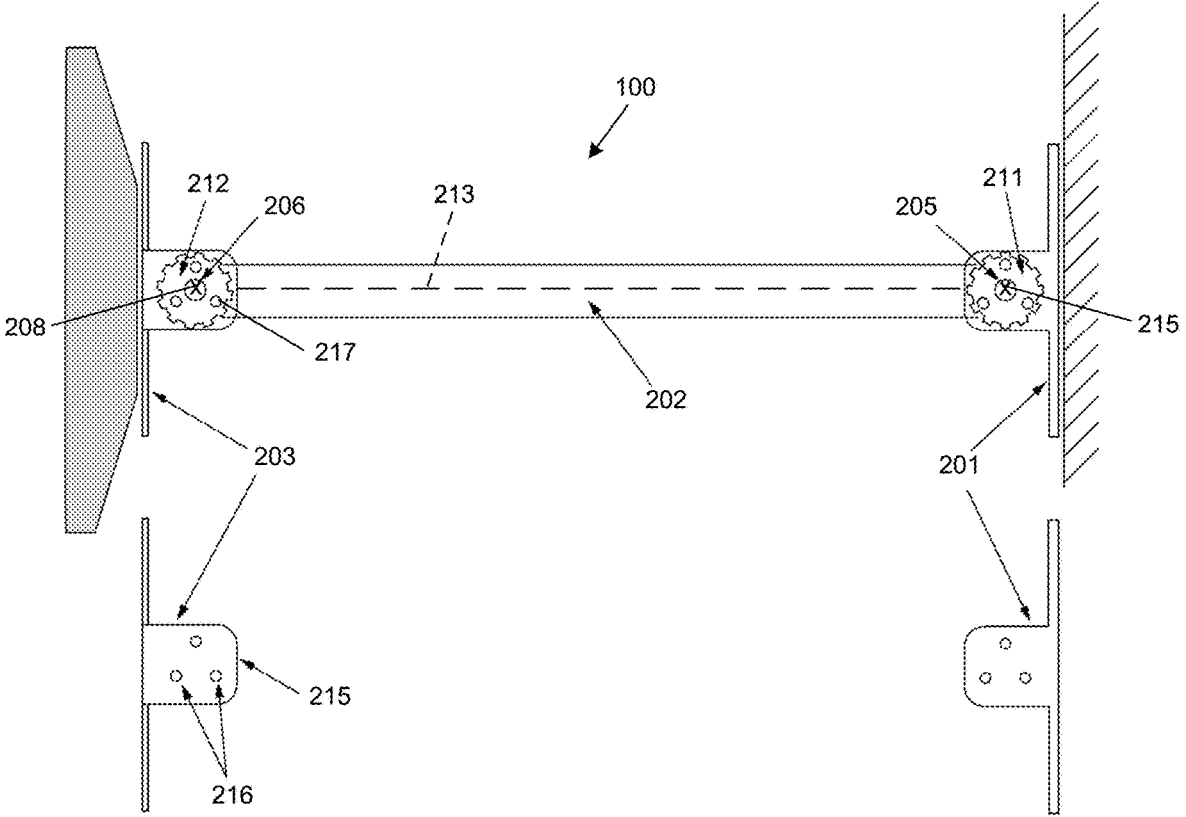
FIG. 6 is a side view of components of the television mounting device and brackets.

FIG. 6 is a side view of components of the mounting device 100 and the brackets 201, 203 are shown removed. Each of the brackets 201, 203 includes holes 216 configured to receive fasteners 217 (one installed fastener is identified in FIG. 6). The number, position, and configuration of the holes 216 and fasteners 217 can be selected based on the forces to be transmitted between the indexers 211, 212. The axes of rotation 215, 208 (see FIG. 18) can be defined by pivots or pins 205, 206, respectively. The pivots 205, 206 can be coupled to the brackets 201, 203. The axes of rotation 215, 208 can lie in an imaginary plane that is substantially parallel to a longitudinal axis 213 of the arm 202.

Figure 7:
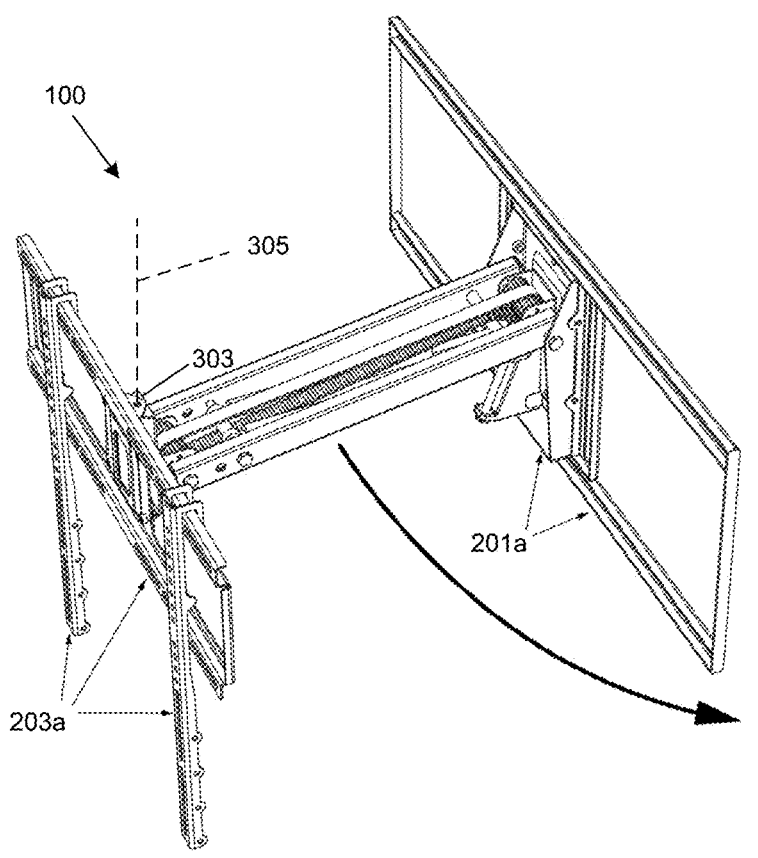
FIG. 7 is an isometric view of the television mounting device in accordance with an embodiment of the technology.

FIG. 7 is an isometric view of the mounting device 100 in accordance with an embodiment of the technology. The description of the mounting device 100 of FIGS. 1-6 applies equally to the mounting device 100 of FIG. 7 except as indicated otherwise. The mounting device 100 of FIG. 7 can include a swivel device 303 that allows side-to-side movement of the television mounting bracket 203. For example, the television mounting bracket 203 can rotate about a vertical axis of rotation 305 by manually pushing/pulling on the television (shown removed in FIG. 7). In other embodiments, the swivel device 303 can include one or more motors for automatic rotation. In some modes of operation, the motorized swivel device 303 can be synchronized with motors used to raise or lower the mounting device 100 to provide for complex fluid movements about multiple axes. In other embodiments, the motorized swivel device 303 can operate independently of the motors for raising and lowering the mounting device 100.

Figure 9:
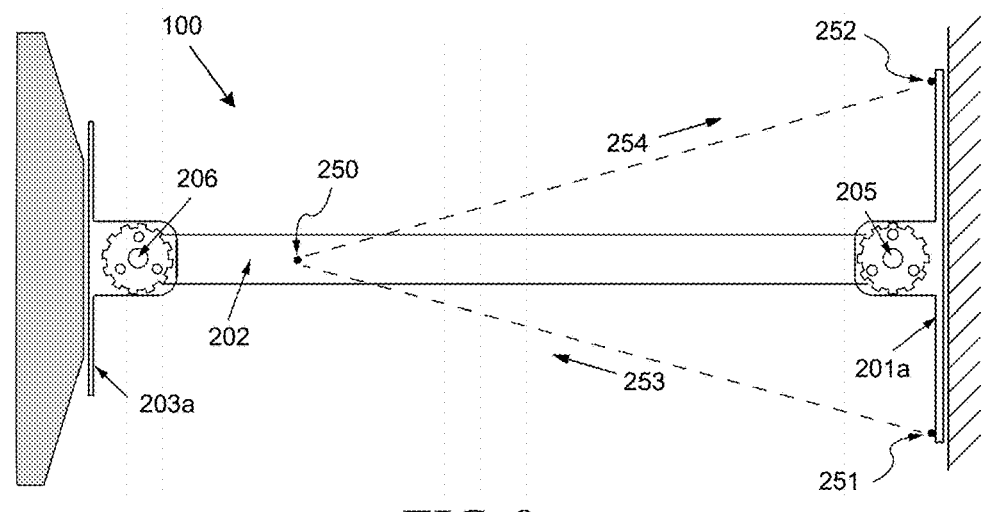
Figure 10:
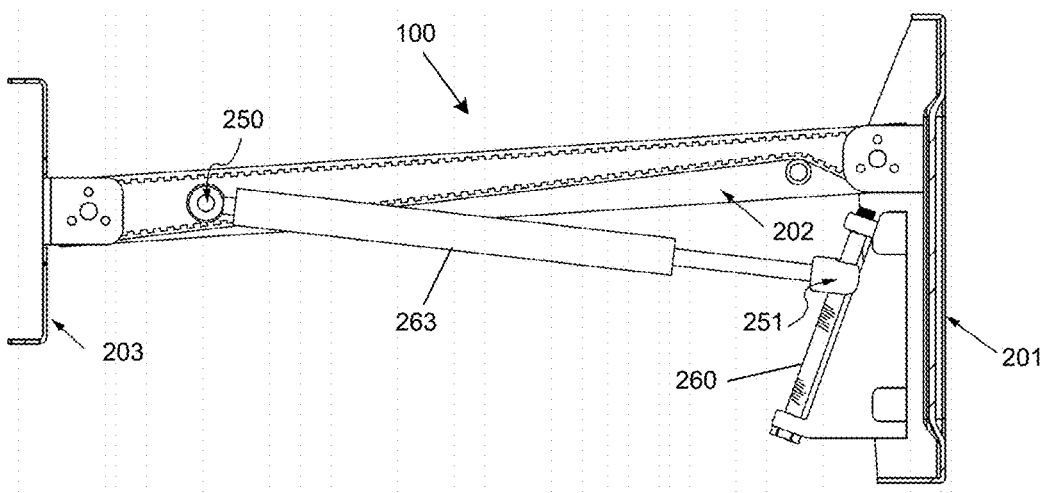
Figure 11:
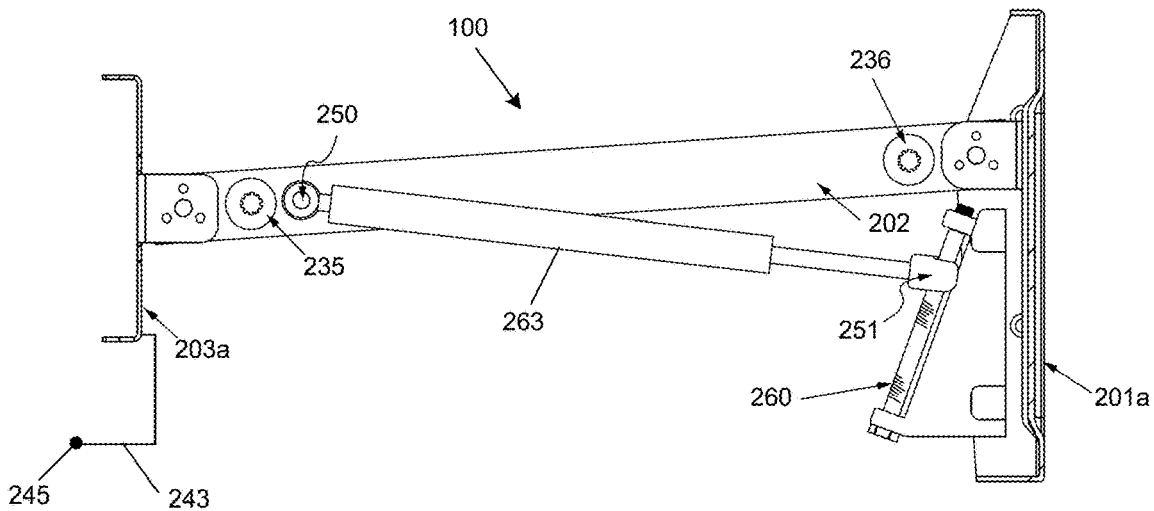

FIGS. 9-11 show a method of operating the mounting device 100 in accordance with embodiments of the technology. Referring now to FIG. 9, the mounting device 100 can include a means for pushing force, such as compression springs, gas springs, electronic actuators, or equivalent, located along a path 253 to push upward from a lower area 251 on the wall mounting bracket 201 to an area 250 on the arm 202. Alternatively, a means for pulling force, such as tension springs, gas springs, electronic actuators, a motorized cable pulley system, or equivalent, can be located along a path 254 to pull upward from a higher area 252 on the wall mounting bracket to an area 250 on the arm 202. The amount of compensating force that is applied can be selected as adjustable or fixed. In some embodiments, the mounting device 100 includes force generating devices along one or both the paths 253, 254. The mounting device 100 can be installed for desired motion (e.g., vertical or horizontal motion) of the arm 202. In embodiments for raising/lowering displays, FIG. 9 is a side view. In embodiments for horizontal movement of displays, FIG. 9 is a plan view.

FIGS. 10-11 show gas pistons 263 rotatably coupled to the arm 202. A user can manually adjust the relative position (e.g., increase or decrease angular position) of gas pistons 263 to adjust the force applied by gas pistons 263 to the arm 202. For example, the carriage 332 can be translated up or down along a rotatable rod 260 (FIGS. 10 and 11). The configuration, functionality, and components of means for pushing can be selected based on the range of motion of the mount assembly, the weight of the television, and the size of the mounting device 100. The description of the mounting device 100 of FIGS. 1-11 can apply equally to other mounting systems and devices disclosed herein.

The television mounting portion of FIG. 11 includes a handle 243 with a temperature element 245 (e.g., temperature sensor, gauge, etc.). The temperature element 245 can change color in response to temperature changes. For example, the surface of the handle 243 can turn red when the handle is at or above a preselected temperature that could cause, for example, damage to the TV. In some embodiments, the temperature element 245 is a temperature sensor in communication with a controller as discussed in connection with FIG. 29 and/or in communication with a computing device, such as a smart phone, computer, tablet, etc. Any of the mounts disclosed herein can include a temperature detecting handle, temperature sensors, or components for providing environmental information.

FIG. 12 is a side view of a mounting device 300 in accordance with embodiments of the technology. The television 110 can also be tilted from a first position to a second position. For example, the television 110 can be angled downwardly when in the raised position and can move to a generally vertical orientation when in the lowered position. The indexer or sprocket 211 has a lobe 211*a* (FIG. 13) to perform the function of a cam. When the arm 202 is in the lowered position, the cam lobe 211*a* does not touch the timing belt 225. As the arm 202 is raised, the cam lobe 211*a* engages and requires more length of the timing belt 225, causing indexer or sprocket 212 to rotate forward faster than the alignment of sprocket 211. This will cause the TV mounting bracket 203, and therefore the television 110, to tilt forward in relation to the wall as the TV is raised so that the TV can be tilted in the up position and not tilted in the lowered position. The cam lobe 211*a* could instead be a separate piece adjacent to a round sprocket 211 such as a block or pin that is inserted and removed as desired. The pulley 224 can function as a tensioner pulley. In some embodiments, the television system can include a mount and different types of indexers (e.g., sprockets) that can be installed by the user. A user can install the indexers selected based on the desired type of motion.

Additionally or alternatively, the sprockets can be incorporated into other components. For example, a mounting bracket 201 of FIG. 12 can have an integrated indexer or sprocket 211 formed via, for example, a machine or molding process. A lobe or spacer can be installed on the integrated sprocket 212 to adjust the positional relationship of the television 110 and bracket 203. In other embodiments, the sprocket 212 can be a separate component mounted to the wall 120. For example, the sprocket 211 can be mounted directly to the wall 120 using one or more connectors. The arm 202 would move relative to the sprocket 211, which remains stationary during use. The configuration, shape, dimensions, and mounting arrangements of sprockets 211, 212 can be selected based on the selected motion of the television 110.

FIG. 14 is a side view of a mounting device 400 in accordance with embodiments of the technology. The mounting device 400 can include a gear train or gear assembly 226 ("gear assembly 226"). The gear assembly 226 includes a set of idler gears 227 and gears 211, 212. The idler gears 227 can be pivotally mounted to the arm by respective pins 229 (one identified in FIG. 14) and can be geometrically congruent to one another. The number, configuration, and placement of the gears 227 can be selected based on configuration of the arm 202. Each of the gears 211, 212 enmeshes with a respective outer idler gear 227 such that the gear 212 communicates directly with gear 211 via idler gears 227.

As the mounting device 400 is manually raised or lowered, the idler gears 227 cause the idler gear 212 to keep the same rotational alignment as the gear 211. The adjacent idler gears 227 rotate in opposite directions to cause rotation of the gear 212 about the pivot 206. The stationary gear 211 can be fixed to the wall mounted bracket 201, so the TV mounting bracket 203 is kept substantially parallel to the wall 120. The gear assembly 226 can include one or more worm gears, spur gears, pulley systems, motors, pivots, or combinations thereof selected based on the desired configuration of the mounting device 400, mechanical advantage, and/or range or motion.

Figure 15:
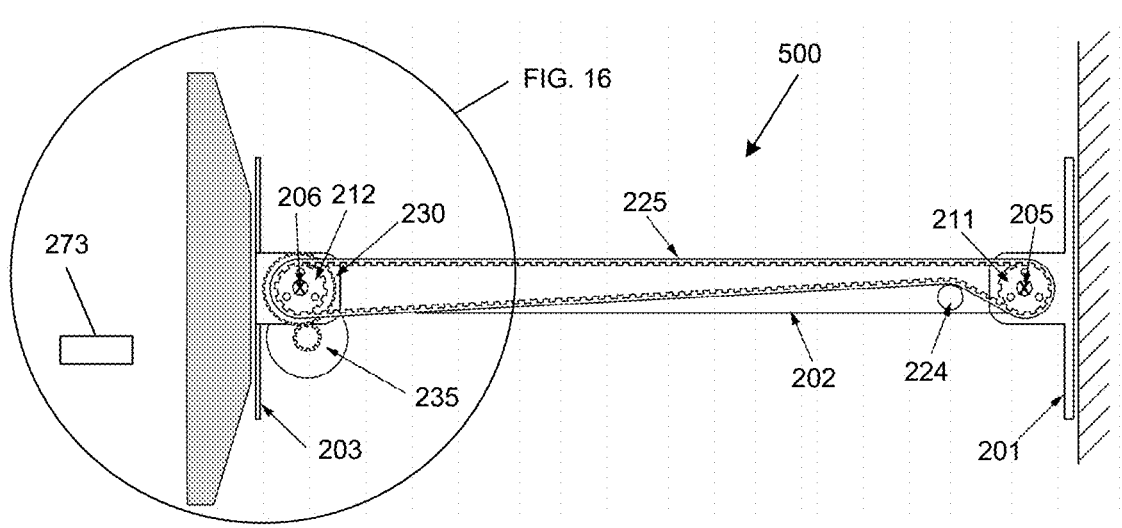
FIGS. 15 and 16 are side views of a television mounting device in accordance with embodiments of the technology.

FIG. 15 is a side view of a mounting device 500 in accordance with embodiments of the technology. The mounting device 500 can include sprockets 211, 212 and an auxiliary gear 230. The sprocket 212 can be rotationally fixed to the gear 230 and to the TV mounting bracket 203. A motor 235 carried by the arm 202 can operate to adjust the angular position of the TV mounting bracket 203. In operation, the motor 235 can rotate the gear 230, the sprocket 212, and the television mounting bracket 203 so as to change the angle of the television mounting bracket 203 relative to the arm 202. The motor 235 can be a stepper motor, a drive motor, or another motor capable of driving the components of the mounting device 500. When the motor 235 rotates the sprocket 212 about the pivot 206, the connector 225 forces the sprocket 212 to maintain rotational alignment with the sprocket 211 such that the arm 202 rotates about pivot 205 to keep the TV mounting bracket 203 at a target position (e.g., a substantially parallel orientation relative to the wall or another suitable position). Accordingly, the illustrated arrangement ensures that the TV mounting bracket 203 remains at the same angular or tilt position as the TV mount 500 is raised and lowered.

Figure 16:
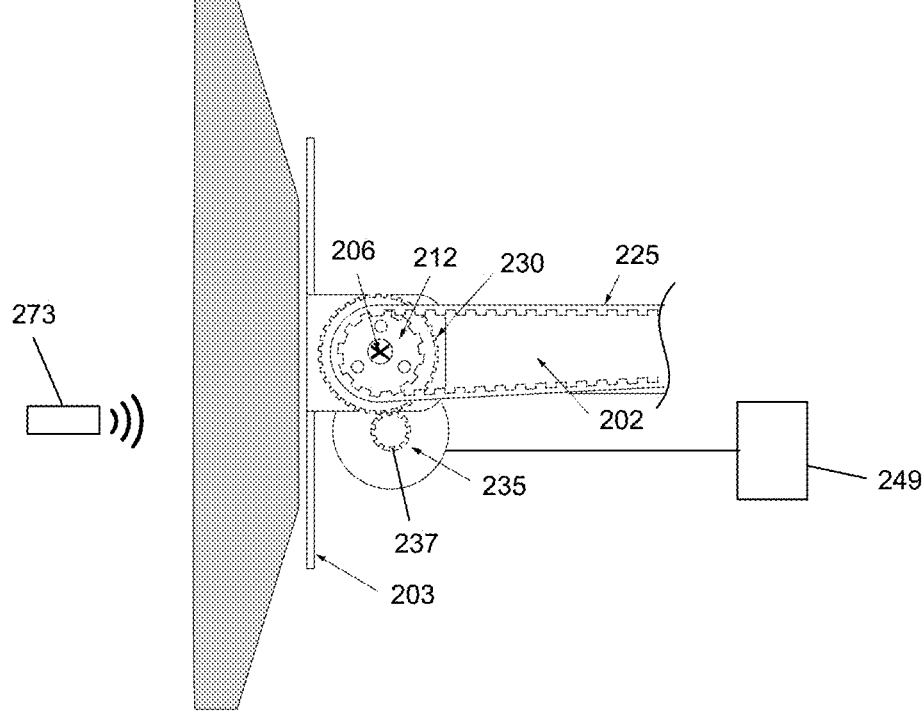

FIG. 16 is a detailed view of the components of the mounting device 500. The motor 235 has a drive gear 237 that engages the gear 230, which can be translationally fixed to the sprocket 212. When the motor 235 operates, the drive gear 237 rotates, causing rotation of the gear 230, which in turn causes rotation of the sprocket 212. The configuration and connection between the gears can be selected based on target gear ratios, mechanical advantage, or the like.

The motor 235 is in communication with a controller 249 via a wired or wireless connection. The controller 249 can include, without limitation, one or more electronic modules, power supplies, software, or combinations thereof. The controller 249 can include a receiver that is communicatively coupled (e.g., wirelessly coupled, capacitively coupled, inductively coupled, or the like) to a transmitter of a remote control 273. Exemplary controllers and controller components are discussed in connection with FIG. 29.

The controller 249 and/or remote control 273 can include one or more input elements (e.g., keys, touch screen, buttons, etc.), microphones, and memory. Buttons can include preset position buttons, up/down buttons, tilt buttons, swivel buttons, or the like. The memory can include, without limitation, volatile memory, non-volatile memory, read-only memory (ROM), random access memory (RAM), and the like. Stored information can include, but is not limited to, executable instructions for performing methods disclosed herein, settings, the weight of the mounted object, or the like. Settings can include, but are not limited to, position settings (e.g., stowed positions, lowered positions, intermediate positions, or the like), schedules (e.g., schedules to automatically move the object), or the like.

Figure 17:
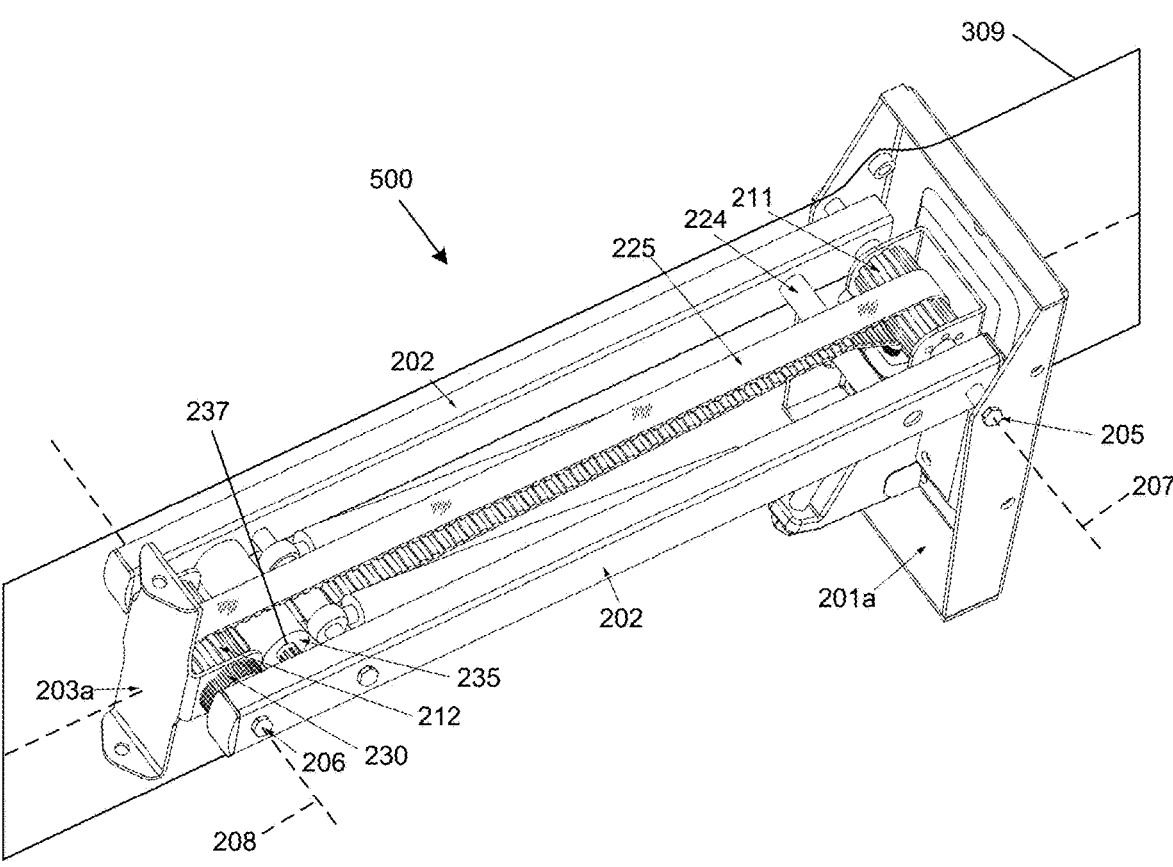
FIG. 17 is an isometric view of components of the television mounting device of FIGS. 15 and 16.

FIG. 17 is an isometric view of components of the mounting device 500 including a pair of arms 202 located on opposite sides of the flexible connector 225. The pivots 205, 206 can connect the arms 202. The flexible connector 225 can extend generally parallel to the arms 202 and a midplane or mid-sagittal plane 308 of the mounting device 500. The motor 235 and a counterbalancing device (not shown in FIGS. 15 and 16), pivots, indexers 211, 212, and other features can be positioned between the arms 202. An optional cover can protect internal components and can be mounted on the arms 202.

Figure 18:
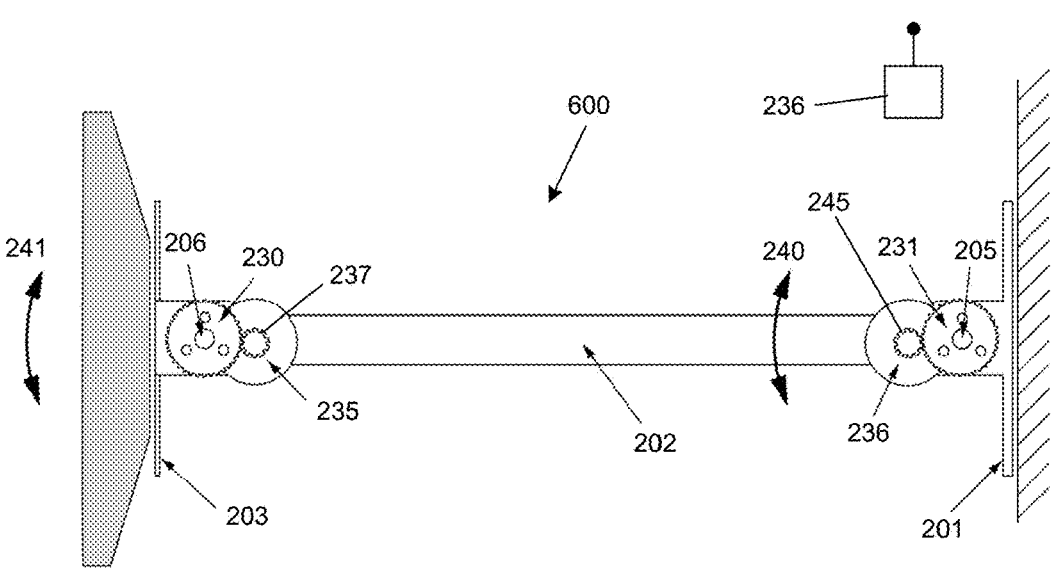
FIG. 18 is a side view of a television mounting system in accordance with embodiments of the technology.

FIG. 18 is a side view of a television mounting device 600 in accordance with embodiments of the technology. The television mounting device 600 can include indexers 230, 231 coupled to the brackets 201, 203, respectively. The indexer 231 can be fixedly connected to the bracket 201, and the arm 202 can be rotatably coupled to the bracket 201 by a pivot 205. A motor 235 can be coupled to an opposing end of the arm 202 and can include a drive gear 245 that enmeshes the gear 231. The indexer 230 can be fixedly connected to the bracket 203, and the bracket 204 can be pivotally coupled to the arm 202 by a pivot 206. The motor 235 can be fixedly coupled to the arm 202 and can include a drive gear 237 that enmeshes the indexer 230. In operation, the motor 239 moves a drive gear 245 to force the arm 202 to rotate about the pivot 205, as indicated by arrows 240. The motor 235 moves a drive gear 237 to force the TV mounting bracket 203 to rotate about the pivot 206, thereby tilting the television as indicated by arrows 241.

Figure 19:
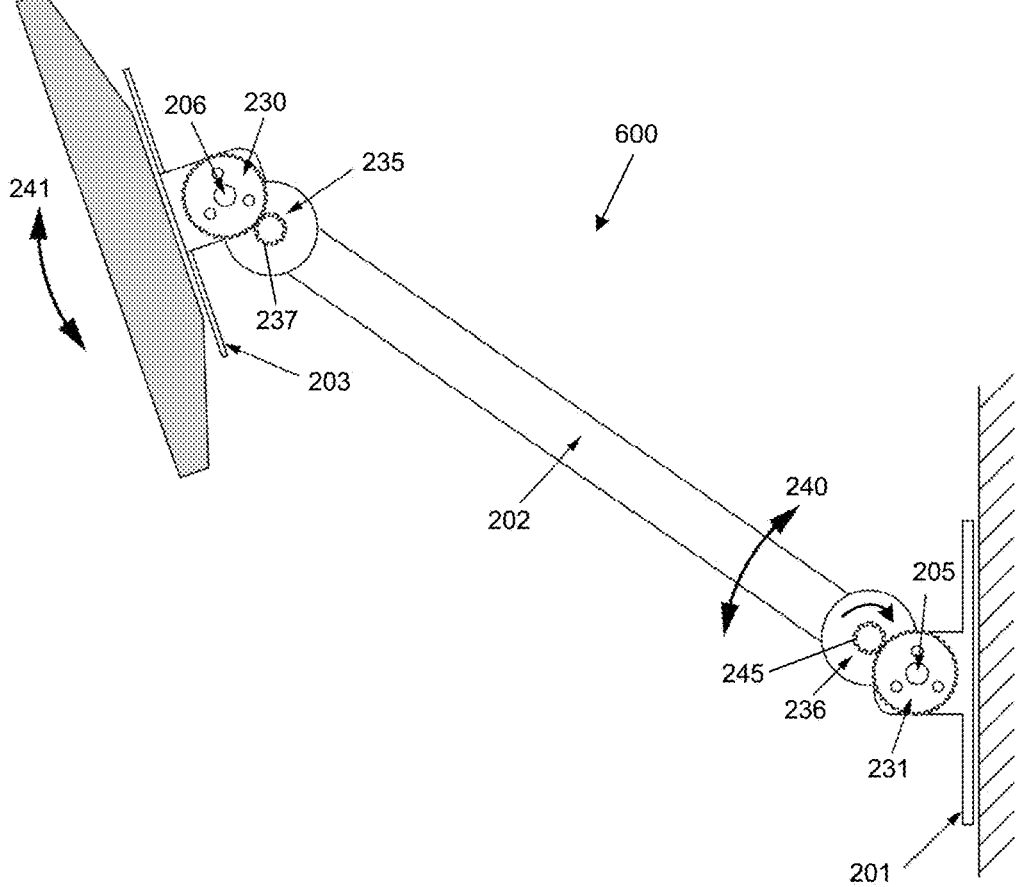
FIG. 19 shows the television mounting system of FIG. 18 in a partially raised position after motors have tilted a top of a television forward and rotated an arm upwardly.
Figures 20, 21:
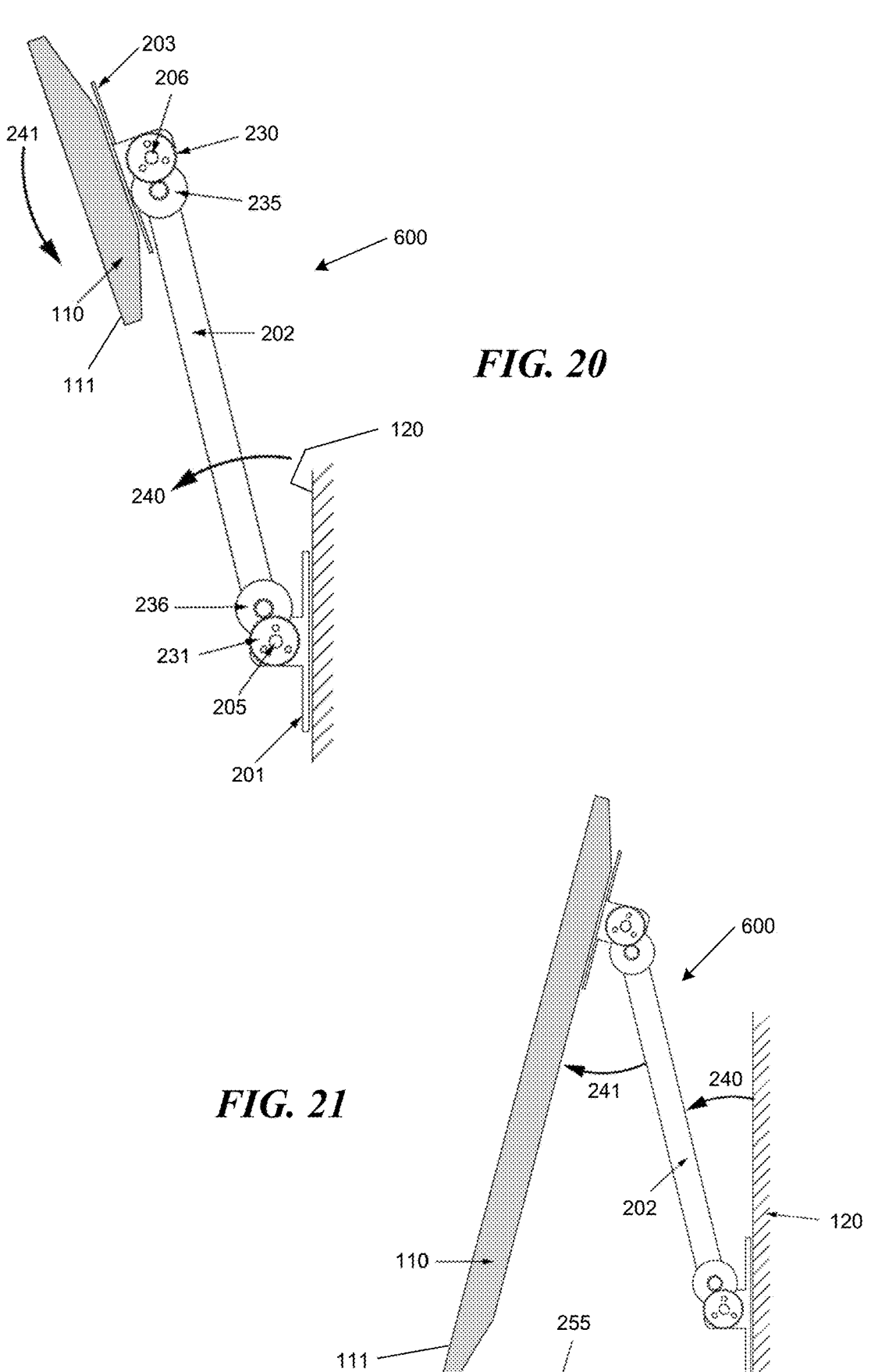
FIG. 20 shows the raised arm angled slightly outward from the wall and a bottom of the television angled downwardly slightly.
FIG. 21 shows the arm angled outward slightly from the wall and the television angled slightly upwardly.

FIGS. 19-21 show the mounting device 600 in different configurations. FIG. 19 shows the mounting device 600 after the motor 239 has rotated the drive gear 245 clockwise. The motor 235 has operated to cause the drive gear 237 to rotate counterclockwise, thereby driving the indexer 230 clockwise. In this manner, the arm 202 has been raised and the display bracket 203 has been tilted downwardly. The mounting device 600 can also include one or more optional motors for moving (e.g., swiveling, tilting, panning, etc.) the display bracket 203. Additional configurations are discussed in connection with FIGS. 20-22.

FIG. 20 shows the partially raised arm 202 angled outward from the wall while the bottom 111 of the television 110 has been rotated inwardly slightly. The television 110 is tilted downward for better viewing while in the raised position. While the arm 202 remains stationary, the motor 235 can operate to cause rotation of the television mounting bracket 203 about the pivot 206, as indicted by arrows 241.

FIG. 21 shows the arm 202 rotated outward slightly (indicated by arrow 240) from the wall 120 and the bottom of the television 110 also rotated outward slightly (indicated by arrow 241) to keep the bottom 111 of the television 110 at a height, within a range of heights, or above a specific height. For example, the bottom 111 of the television 110 can be kept at or above a height 255 while it moves outward until it clears the mantel. The television 110 can then be rotated to be parallel to the wall in the final lowered position.

Figure 22:
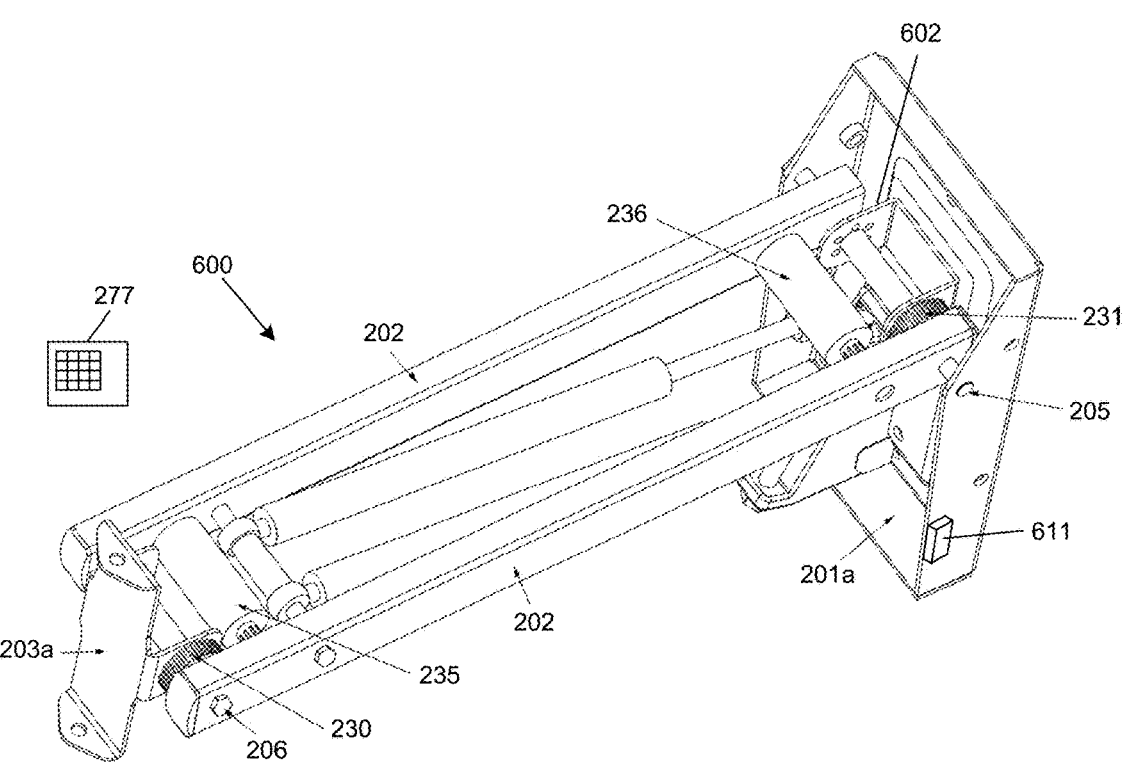
FIG. 22 is an isometric view of a motorized television mounting device with a pair of gas springs and positioning motors.

FIG. 22 is an isometric view of the motorized mount 600 with a pair of gas springs. The motors 235, 236 can be mounted between spaced apart arms 202 and, in some embodiments, a cover can extend over the internal components and the arms 202. The indexer 231 can be adjacent to a U-shaped bracket 602. A pin 205 extends through a mounting or support bracket 201, indexer 231, and U-shaped bracket 602. In some embodiments, one or more sprockets or gears (e.g., spur gears, planetary gears, worm gears, etc.) can be used to transmit forces between the motors 235, 236 and the gears 230, 231, respectively. Rotation of components can be synchronized for desired positioning and can be achieved via wireless communication with a controller 249. For example, the motors 235, 236 can include communication modules and one or more transmitters/receivers, power supplies, and circuitry (e.g., internal controllers) for communicating with a control device 611 and/or a controller 249. Exemplary control devices and controllers are discussed in connection with FIG. 29.

Figure 23:
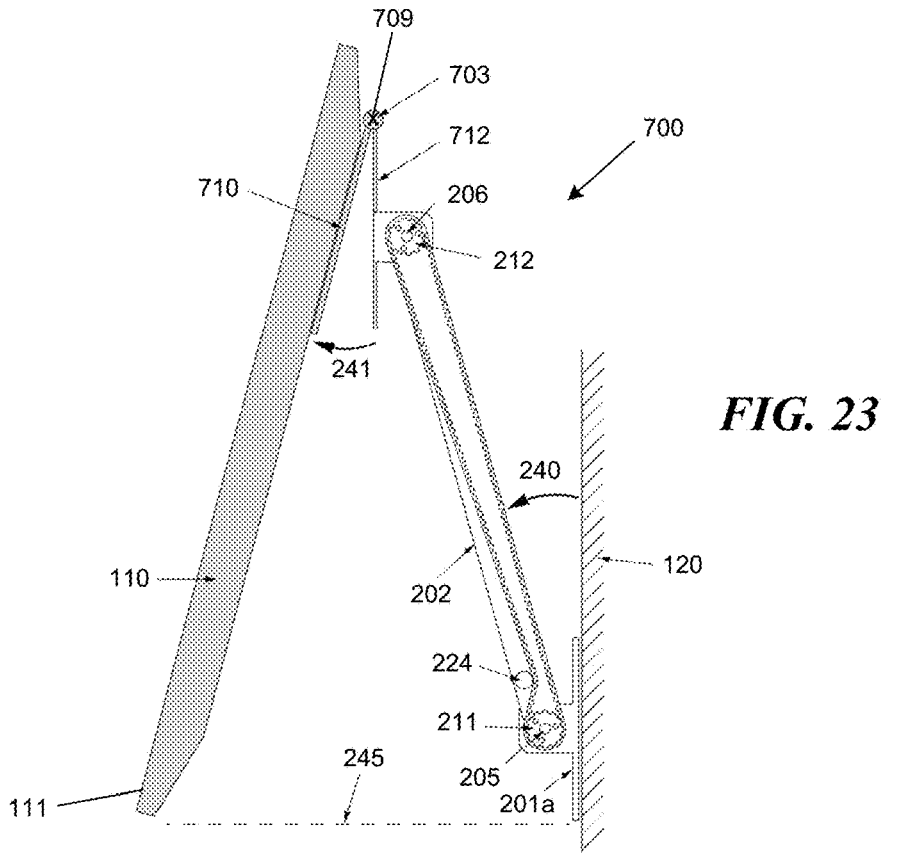
FIG. 23 is a side view of a television mounting device in accordance with embodiments of the technology.

FIG. 23 shows mounting device 700 in accordance with embodiments of the technology. The television 110 may be as tall as the mounting device 700. If the mounting device 700 is mounted above the fireplace close the mantel, the bottom of the TV 110 might strike and contact the mantel when the television 110 moves downwardly. To avoid such contact, an optional pivot mechanism 703 can allow the bottom 111 of the television 110 to be swung outwardly away from wall 120. The pivot mechanism 703 can include a TV mounting bracket or front portion 710 and an arm mounting bracket or back portion 712. A substantially horizontal axis of rotation 709 about which the front portion 710 rotates can be generally perpendicular to a mid-sagittal plane (see midsagittal plane 309 of FIG. 17) of the mounting device. In operation, when the arm 202 rotates outwardly away from the wall, as indicated by arrow 240, the TV 110 can also rotate outward slightly, as indicated by arrow 241, about the axis 709. In some embodiments, the axis of rotation 709 is generally horizontal and parallel to the wall 120 to allow the bottom 111 of the television 110 to be kept at or above a preselected height 255.

If the mounting device 700 is installed above a mantel, the television 110 can rotate outwardly when the device 700 is lowered so as to keep the television 110 from striking the top of the mantel. After the television 110 clears the mantel, the television 110 can rotate to be parallel to the wall 120 in the final lowered position. In some embodiments, a user can pull the bottom 111 of the television 110 outwardly away from the mantel. In motorized embodiments, the mounting device 700 can include one or more contact sensors, position sensors, motion detectors, and/or other sensors that can provide signals or feedback used to track motion (e.g., user motion, mount motion, etc.), avoid collisions between the TV and surrounding objects, etc. In some embodiments, the pivot mechanism 703 can include one or more plates, hinges, motors, or other components for motorized movement of the television 110. For example, the pivot mechanism 703 can be a hinge. The configuration and operation of the pivot mechanism 703 can be selected based on the desired positioning of the television 110.

Mounting Technology

The television mounting devices disclosed herein can be mounted on different support structures, including the outside of the wall, inside the wall, or other suitable mounting location. For example, the television mounting device of FIGS. 1 and 2 can be mounted to structural elements (e.g., studs, blocking, columns, etc.) within the wall 120 using fasteners, such as screws (e.g., mason screws, wood screws, etc.), bolts, anchors (e.g., sleeve anchors, wedge anchors, etc.), or the like. Mason screws or anchors can be used to mount the mounting device 100 to brick walls. Television mounting devices can also be configured to be partially or completely positioned within support structures as discussed in connection with FIGS. 24-26 and can be oriented to raise/lower televisions, move televisions horizontally, or the like.

FIG. 24 is a side view of a partially recessed television mounting device 800 in accordance with embodiments of the technology. The television mounting device 800 can include a mounting assembly or bracket 802 ("mounting bracket 802"), a connector assembly 804, and a television bracket 806. The one-piece or multipiece mounting bracket 802 can include one or more housings 810 (e.g., recess boxes, braces, etc.), connectors 812, fasteners, sensors (e.g., position sensors, contact sensors, temperature sensors, water sensors, etc.), conduits (e.g., tubes for wiring), power supplies, or combinations thereof. At least a portion of the connector assembly 804 can be received within an interior space 814 of the mounting bracket 802. The interior space 814 can be defined between an imaginary plane along a front surface 815 of the wall 120 and a back wall 816 of the housing 810. When the television mounting device 800 is moved to the raised position, at least a portion of the connector assembly 804, illustrated as a cantilever arm, can be moved into the interior space 814.

FIGS. 25 and 26 are elevation views of recessed television mounting devices in stowed positions in accordance with embodiments of the technology. Referring now to FIG. 25, a television mounting system 820 can include a mounting assembly or bracket 822 ("mounting bracket 822"), a connector assembly 824, and a television bracket 829. In the first or raised position, the television bracket 829 can be completely received within an interior space 828 of the mounting bracket 822. The mounting bracket 822 can include, without limitation, a housing 826 configured to receive a substantial portion or all of the connector assembly 824. The mounting bracket 822 can include, without limitation, pins, hinges, connectors, or bracket elements. As shown in FIG. 25, all the components of the television mounting system 820 can be positioned rearwardly away from an imaginary vertical plane 830 extending along the front surface of the wall 120.

Referring now to FIG. 26, a television mounting system 840 can include a mounting assembly or bracket 842 ("mounting bracket 842"), a connector assembly 844, and a television bracket 846. The stowed television bracket 846 can be completely received within an interior space 860 of the mounting bracket 842. The mounting system 840 can include auxiliary components 850 positioned within the interior space 860. The auxiliary components 850 can include, without limitation, controllers, wiring, counterbalancing mechanisms, biasing devices, linkages, or combinations thereof. In some embodiments, the back of the television 110 can contact and/or lay flush along the wall 120 and cover all or a portion of the opening of a housing 866 of the mounting bracket 842.

The mounting devices 800, 820, and 840 can be installed at other orientations. If the television mounting device 800 is oriented such that FIG. 24 is a top view, the arm 804 can be rotated horizontally for side-to-side movement of the television. The mounting devices 820 and 840 can also be installed for non-vertical movement, including side-to-side or horizontal movement.

The connector assemblies disclosed herein can be arms, linkage assemblies (e.g., two-bar linkages, three-bar linkages, four-bar linkages, five-bar linkages, etc.), swing arms, or the like. The brackets disclosed herein can include spacers, holders, sliders, rails, fasteners, stops, and/or other components that cooperate to facilitate mounting. The sizes, configurations, and functionality of the mounting brackets can be selected to provide a suitable appearance and positioning. For example, mounting brackets hidden within a wall can provide an aesthetically pleasing appearance and remain hidden when the television is in a lower position. A stationary movable plate or covering can extend across the opening or the bracket to keep components of the TV mount system obscured.

Motorized Mounting Systems

Figure 27:
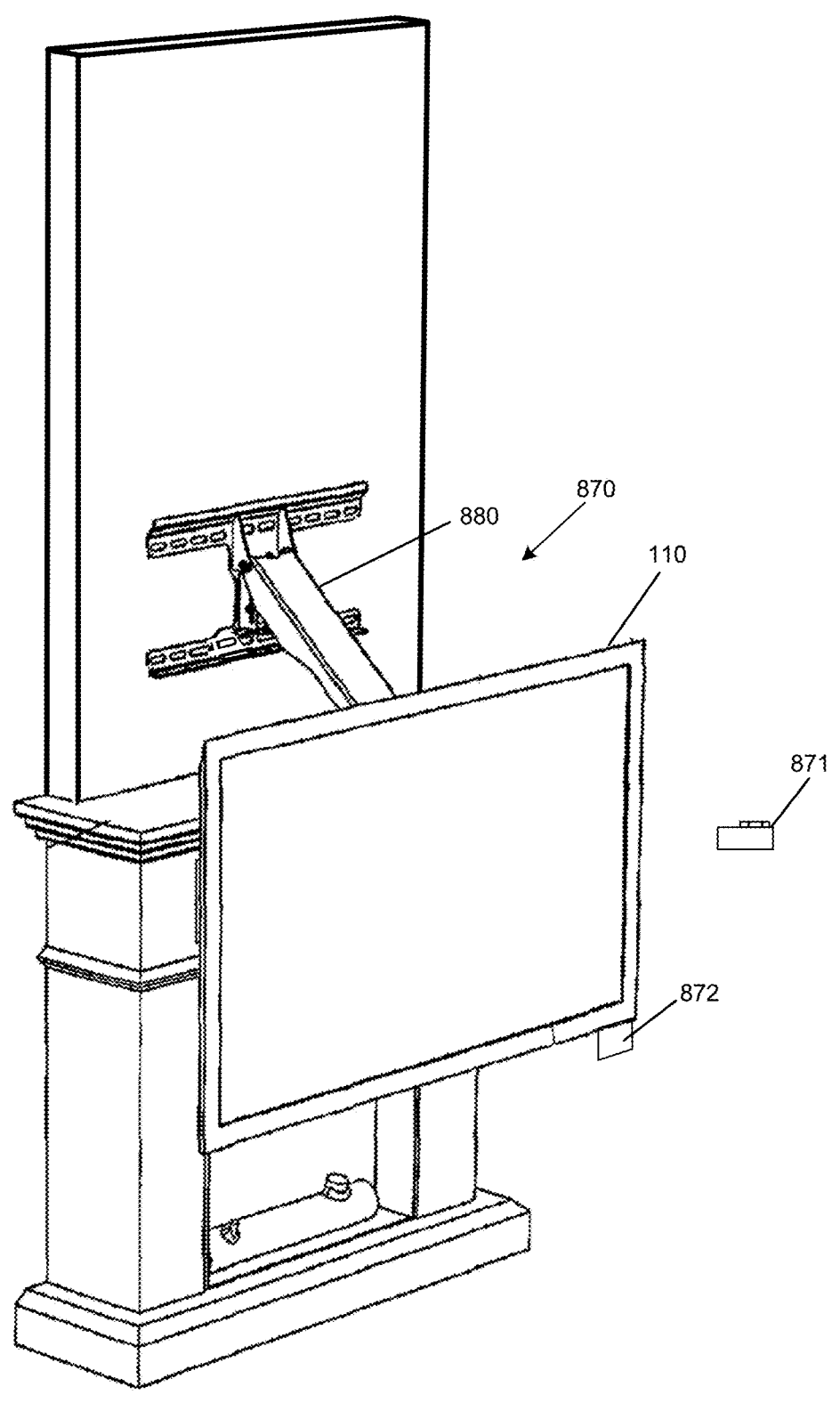
FIG. 27 shows a lowered television held by a motorized mounting system in accordance with an embodiment of the technology.

FIG. 27 illustrates a motorized automated mounting system 870 that can be moved using a controller 871 that communicates with a control device/controller 872. The automated mounting system 870 can be any of the mounts disclosed herein and can include a motorized mounting device 880 that raises and lowers the television 110. The control device 872 can include a receiver that is communicatively coupled (e.g., wirelessly coupled, capacitively coupled, inductively coupled, or the like) to a transmitter of the controller 871. The control device 872 can store information in memory, and the stored information can include, but is not limited to, television position settings (e.g., height, tilt, etc.), the weight of the mounted object, or the like. Settings can include, but are not limited to, television positions (e.g., stowed positions, lowered positions, deployed positions, intermediate positions, or the like), gear settings, rotational relationship settings, schedules, motor settings, motor relationships, kinematic equations, or the like.

The controller 871 can be a wireless controller or remote with artificial intelligence functionality or other suitable functionality. For example, the controller 871 can include or be compatible with hubs or automation devices (e.g., Google Home, Amazon's Alexa, etc.), or other suitable devices for receiving input from users. Voice commands can be used to raise and lower the mounting system, set mounting system positions, program mounting systems, or the like. In some embodiments, the controller 871 can communicate wirelessly or via a wired connection with another device, such as an IoT hub or digital assistant (e.g., Google Home, Microsoft Cortana, Amazon Alexa, etc.). Wireless communication can be via a local network (e.g., WiFi network) or other suitable network. Additionally or alternatively, the controller 871 and/or control device 872 can communicate with a hub, router, or electronic controller, such as Google Home, Amazon Echo, or the like. In some embodiments, the mounting system 870 can be controlled with one or more voice commands, such as "Siri" (Apple), "Alexa" (Amazon), "Cortana" (Microsoft), Xbox, "OK Google" (Google), and so forth. A button on the controller 871 and/or control device 872 can be used to input/receive voice commands. The control device 872 can have one or more voice detectors (e.g., microphones) that operates to receive voice commands. The controller 871 and/or control device 872 can include one or more communication elements configured to communicate using a mesh network protocol, ZigBee® communication protocol, Z-Wave® communication protocol, wireless local area network, home wireless communication protocols, IoT protocols, or another communication protocol, such as 802.11.

The control device 872 can communicate directly with any number of communication devices and may include one or more sensors for detecting movement, position, temperatures, combinations thereof, or the like. By way of example, the control device 872 can include motion sensors configured to detect motion, such as gestures. Position sensors can be used to detect the position of obstacles. The control device 872 can have proximity sensors for detecting the position of viewers, motion, or the like. Viewer motion and position can be tracked to identify command gestures, positional information (e.g., optimum viewing positions), and so forth. In one embodiment, the control device 872 includes one or more cameras for determining the position of viewers, identifying objects, etc., and the control device 872 can determine the optimal display location using viewing algorithms. Identification software (e.g., facial recognition software) can be used to identify different people and to retrieve appropriate positions. Viewers can have different preferred positions stored in memory. In some embodiments, the control device 872 has an integrated controller, including the controller discussed in connection with FIG. 29.

Microphones can be used to receive audible information. The control device 872 can include a microphone and be programmed to operate in response to the audible input (e.g., voice commands), determine the location of obstacles, and/or avoid striking obstacles (e.g., shelves, pianos, furniture, or other obstacles). Additionally or alternatively, one or more safety sensors can be utilized and can be incorporated into components of the wall mount system. Additionally or alternatively, the control device 872 can be programmed to move the display to various locations based upon, for example, the location of viewers, user-inputted settings, time settings, schedules, or voice commands. A timer can be used to determine when to automatically raise or lower the display. In some embodiments, authentication can be required to move the display. For example, the mounting system 870 can be actuated only when an authorization password or other identifier is provided. This way, children or other individuals cannot move the display.

Operation of the mounting system 870 can be coordinated with media content, including music, television shows, movies, video games, or other suitable media. In one mode of operation, the mounting system 870 can identify the start of the media (e.g., a movie, sports game, etc.) and can automatically position the display at a suitable viewing position. At the end of the content (e.g., completion of the movie, game, etc.), the wall mount 870 can automatically be raised to the stowed position. When one mounting system 870 is moved, it can send data to one or more other mounting systems. The data can include setting information, instructions, commands, or the like.

Mounting systems can be programmed to have coordinated operation. Each control device can have stored instructions and can communicate with each other via wired or wireless connections. In some embodiments, the mounting systems communicate with each other via a local network. Control devices can be programmed to move mounting systems according to one or more cycles or events. In commercial settings, mounting systems can periodically move to attract attention at, for example, a restaurant, a sports bar, or the like.

If the mounting system 870 is mounted above a mantelshelf, the control device 872 can be programmed to ensure that the mounting system does not strike the mantel (e.g., an upper surface of the mantelshelf) as a television is lowered downwardly past the mantelshelf. At a predetermined time (e.g., after a selected bedtime), the mounting system 870 can be automatically moved to the stowed configuration such that children cannot easily reach and pull on the television the next morning. In some embodiments, the mounting system 870 can be automatically returned to the stowed configuration after the television has been turned off for a certain period of time.

The control device 872 can be programmed to move the television to different positions, each having a different indicator (e.g., number, code, etc.). The indicator can be entered using the controller 871. Additionally or alternatively, the control device 872 can include input devices, such as a touch pad, a touch screen, a keyboard, or the like. A user can use the input device to move the mounting system 870 into different positions without utilizing any remote. If the control device 872 is hidden behind a television, the user can reach behind the television to access the control device 872 and position the television as desired. The controller 871 can be a phone (e.g., Smartphone), tablet, computer, or other suitable electronic device for controlling motorized tilt mechanisms, motorized swivels, or other components. The components and features discussed in connection with FIG. 27 can be incorporated into any other mounts or systems disclosed herein.

Figure 28:
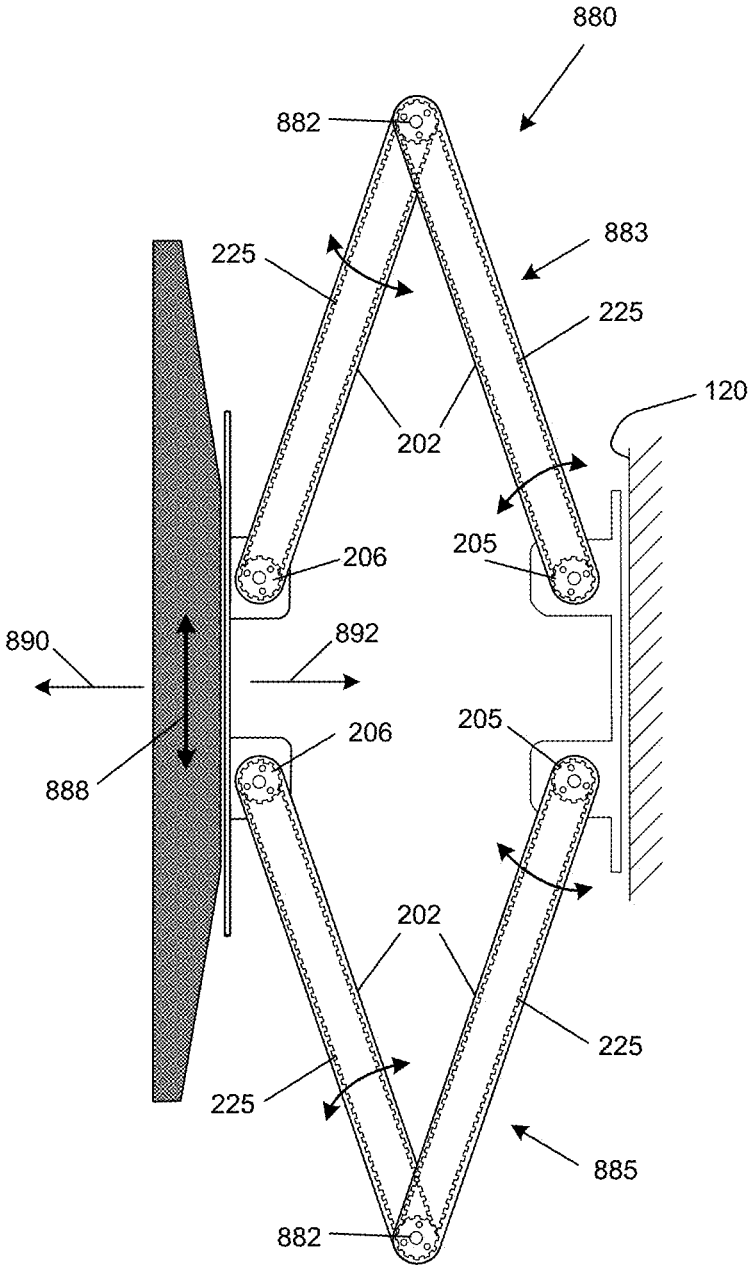
FIG. 28 is a plan view of a motorized mounting system in accordance with an embodiment of the technology.

FIG. 28 is a plan view of a mounting system 880 in accordance with an embodiment of the technology. The mounting system 880 has a pair of arm assemblies 883, 885 each including connected pivoting arms 202. Connectors 225 (e.g., drive belts, tethers, etc.) can connect indexers 205, 882, 206 to coordinate movement between components. One or more motors can be mounted to or incorporated into joints or connections to provide controlled movement. The configuration, components, and functionality of the mounting system 880 can be selected based on the desired movement of the television (e.g., laterally of side-to-side movement 888, forward movement 890, backward movement 892, tilting, swiveling, etc.) A bracket 203 can include one or more swivels, hinges, or other features for rotating the television. In other embodiments, the mounting system 880 can oriented such that FIG. 28 is a side view illustrating vertical movement 888, forward movement 890, backward movement 892, etc. The mounts, assemblies, and components disclosed herein can be mixed and matched to provide desired functionality. The mounting system 880 can include gear assemblies or trains, such as the gear assembly 226 discussed in connection with FIG. 14, carried by the arm assemblies 883, 885.

Controllers

Figure 29:
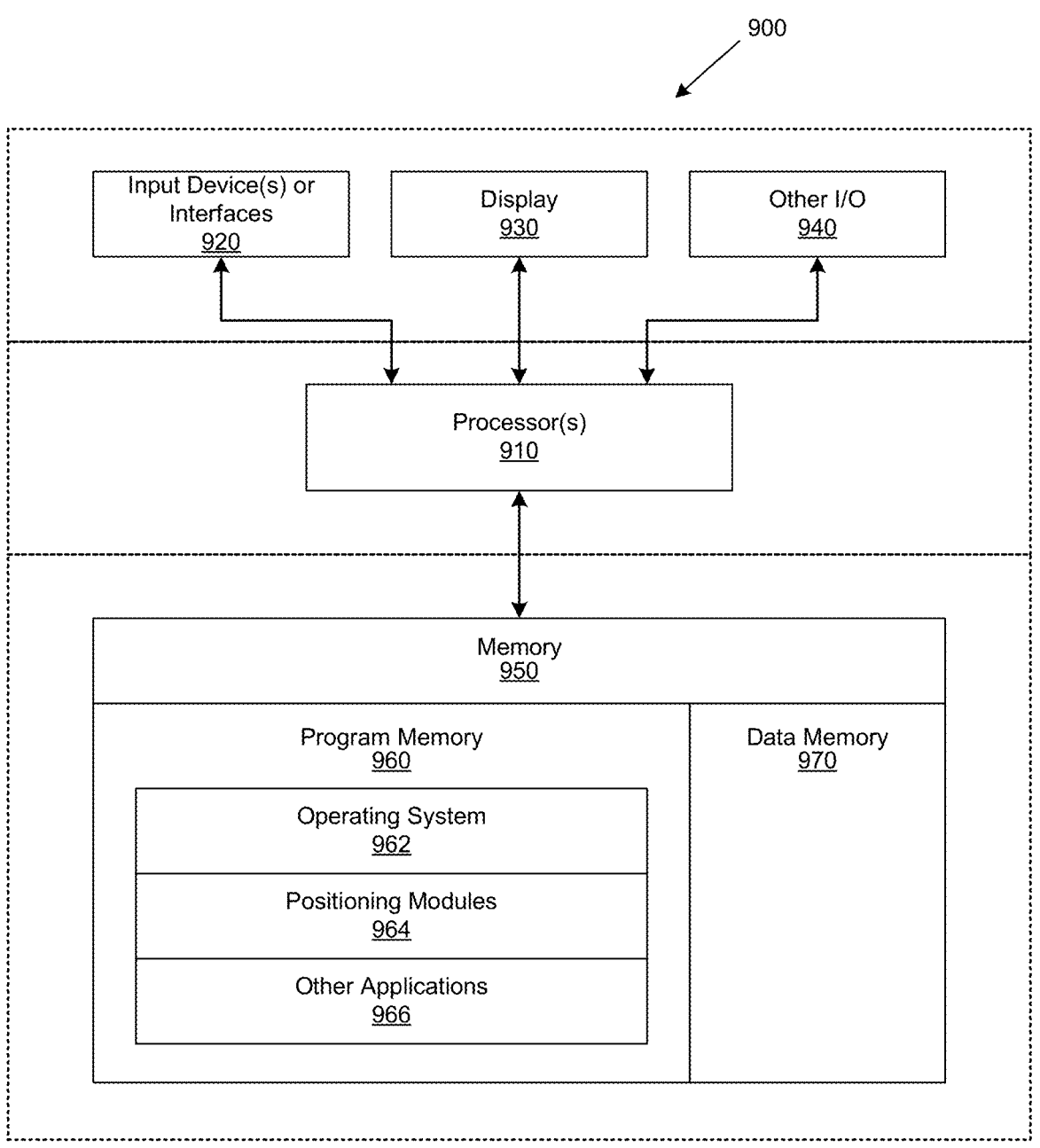
FIG. 29 shows a computing device in accordance with embodiments of the technology.

FIG. 29 illustrates a controller 900 suitable for use in connection with mounts and systems disclosed herein, in accordance with select embodiments of the present technology. The controller 900 can be used to control operation of mounts or can be incorporated in various components of computing devices or mounts, such as control devices (e.g., control device 611 of FIG. 22 or control device 872 of FIG. 27). The controller 900 can include one or more processors 910 (e.g., CPU(s), GPU(s), HPU(s), etc.). The processor(s) 910 can be a single processing unit or multiple processing units in a device or distributed across multiple components. The processor(s) 910 can be coupled to other hardware devices, for example, with the use of a bus, such as a PCI bus or SCSI bus. The processor(s) 910 can be configured to execute one or more computer-readable program instructions, such as program instructions to carry out any of the methods described herein.

The controller 900 can include one or more input device(s) or interface(s) 920 that provide input to the processor(s) 910, e.g., to notify it of actions from a user of the controller 900. The actions can be mediated by a hardware controller that interprets the signals received from the input device and communicates the information to the processor(s) 910 using a communication protocol. Input device(s) or interface(s) 920 can include, for example, buttons, a keypad, a touchscreen, an audio input, voice detector (e.g., microphone), a motion sensor, position sensors, temperature sensor, a keyboard, a touchscreen, an infrared sensor, a port, a camera- or image-based input device, or other user input devices. If controller 900 communicates with a wireless component, the input device(s) or interface(s) 920 can be infrared interfaces, radio remote control interfaces, etc. For example, the controller 900 can be in the form of an infrared wireless remote.

The controller 900 can include a display 930 used to display various types of output, such as television position settings, speed settings, range of motion, time, schedules, routines, network settings (e.g., wired network settings), etc. The processor(s) 910 can communicate with the display 930 via a hardware controller for devices. In some embodiments, the display 930 includes the input device(s) 920 as part of the display 930, such as when the input device 920 includes a touchscreen or is equipped with a motion monitoring system. In alternative embodiments, the display 930 is separate from the input device(s) 920. Examples of display devices include an LCD display screen, an LED display screen, and so on.

Optionally, other I/O devices 940 can also be coupled to the processor(s) 910, such as a network card, video card, audio card, USB, firewire or other external device, speakers, camera, CD-ROM drive, DVD drive, disk drive, or Blu-Ray device. In some embodiments, the I/O devices 940 include one or more HDMI interfaces (HDMI-ARC port, mini-HDMI port, micro-HDMI port, dual-link HDMI port, etc.), optical interfaces, USB, USB-C, component port, S-video port, composite port, coaxial port, or combinations thereof. For example, the other I/O devices 940 can be used to communicate with wired speakers (e.g., Sonos Beam, soundbars, etc.), streaming devices (e.g., streaming sticks, streaming hubs such as Apple TV, 4K streaming devices, etc.), audio receivers, sound systems, or the like. Other I/O devices 940 can further include input ports for receiving data from other sources, such as smartphones, tablets, and/or computers using a network to cast media via a wireless network. In some embodiments, the controller 900 also includes a communication device (not shown) capable of communicating wirelessly or wire-based with a network node. The communication device can communicate with another device or a server through a network using, for example, TCP/IP protocols. The controller 900 can utilize the communication device to distribute operations across multiple network devices, including IoT hubs, IoT bridges, cameras, etc.

The controller 900 can include memory 950, which can be in a single device or distributed across multiple devices. Memory 950 includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. In some embodiments, the memory 950 is a non-transitory computer-readable storage medium that stores, for example, programs, software, data, or the like. In some embodiments, memory 950 can include program memory 960 that stores programs and software, such as an operating system 962, one or more positioning modules 964, and other application programs 966. The positioning modules 964 can include one or more modules configured to perform the various methods described herein (e.g., move mounts, determine television characteristics, select user settings, manage data transfer between components, etc.). Memory 950 can also include data memory 970 that can include, e.g., viewing algorithms, protocols (e.g., communication protocols, network protocols, etc.), configuration data (e.g., load capacities, etc.), libraries (e.g., voice recognition libraries), settings (e.g., manufacturer settings, user settings, trigger settings, event settings, etc.), voice recognition engines, user options or preferences, etc., which can be provided to the program memory 960, positioning coordinates, control maps, or any other element of the controller 900. For example, if the controller 900 is voice-controlled, the data memory 970 can store identification software and/or one or more voice data libraries used to identify voice commands, including wake commands. The controller 900 can be configured to perform voice commands with or without connectivity to a remote server. In some embodiments, the data memory 970 can include machine executable instructions for digital assistants, protocols for communicating with hubs, routers, etc.

The controller discussed herein can control the motors to reconfigure the mounting systems at various configurations. Positional relationships, motor parameters, position matrices, geometric relationships, or the like can be used by the motor to achieve the motion discussed herein. In some modes of operation, a user can input a desired television position. The controller 900 can determine operational parameters for the motors to move the television to the set position. The controller 900 can then command the motors to operate to move the TV along a path, at a desired speed, or the like. If the user wants to change how the TV is moved, the user can use the remote 902 to adjust deployment of the mount. This allows user customization for the position of the television, motion of the television, and the path of travel.

The mounts disclosed herein can include one or more sensors, including temperature elements. A temperature element can be located on the handle to display the ambient temperature. The temperature element can be proximate to the television to warn users if the temperature is too high for the television to safely operate. A means of setting a maximum extension prevents the television from extending beyond a point set by the user. In one embodiment, there is a radial thermometer 71, whereby a dial displays the current ambient temperature near the television to the user. In an alternative embodiment, there is a color changing temperature gauge 72. The color changing temperature gauge comprises a temperature-sensitive material that changes color depending upon the ambient temperature. This enables viewing of the current temperature from a distance. In yet another alternative, the temperature gauge is a digital thermometer with an LCD display. Temperature gauges, handles, and other components that can be incorporated into the systems and mounts disclosed herein are disclosed in U.S. patent Application Publication No. 20120032062, which is incorporated by reference in its entirety. In some embodiments, the controller 900 is in communication with a temperature element in the form of an electronic temperature sensor. If the temperature sensor detects the temperature at or above a user-set threshold, the controller 900 can cause an alert to be sent to a computing device, such as a user smart phone, tablet, or the like. The communication can be transmitted via a local network or a wide area network. If the user receives an alert, the user can adjust the position of the TV. In automatic setting modes, the controller 900 can be programmed to automatically raise a TV when the temperature sensor measures a selected temperature. This allows the television 110 to be automatically moved to suitable operating positions independent of user operation.

RELATED APPLICATIONS AND PATENTS

Additional apparatuses, components, controllers, software, methods of operation, methods for manufacturing, and other features are disclosed in the following patents and applications: U.S. patent Application No. 61/396,850; U.S. Pat. Nos. 8,724,037; 9,876,984; 10,257,460; 10,277,860; U.S. patent Application No. 61/913,195; U.S. Pat. No. 9,625,091; U.S. U.S. Pat. No. 10,281,080; U.S. patent application Ser. No. 16/370,854; U.S. patent application Ser. No. 16/924,551; U.S. patent application Ser. No. 17/026,088; U.S. patent application Ser. No. 16/375,835; U.S. patent application Ser. No. 17/090,701; U.S. patent Application No. 62/553,961; U.S. Pat. No. 10,738,941; U.S. patent application Ser. No. 16/918,718; U.S. patent Application No. 62/950,524; U.S. Pat. No. 8,864,092; and U.S. patent Application No. 62/971,974. For example, cam mechanisms, tilting features, arms, gas springs, spring blocks, calibration screws, adjustment screws, adjustment collars, panning features, counterbalancing features, controllers, motors, etc., can be incorporated into mounts, arms, support brackets, display brackets, or other components disclosed herein. Additionally, the components and features disclosed herein can be incorporated into four-bar linkages, five-bar linkages, and other mounts or systems disclosed in applications or patents incorporated by reference. The systems and devices can be installed at different positions and orientations to move displays (e.g., monitors, televisions, etc.) to desired positions. All patents, applications, and other references cited herein are hereby incorporated by reference in their entirety. Any and all priority claims identified in the Application Data Sheet, or any correction thereto, are also hereby incorporated by reference in their entirety.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A display mounting device, comprising:
a mounting bracket configured to mount to a wall;
a display bracket configured to hold a display;
an arm including a first end pivotally coupled to the mounting bracket and a second end pivotally coupled to the display bracket; and
a drive assembly configured to operate to raise and lower the display bracket, wherein the display bracket rotates relative to the arm when the arm is moved between a raised position and a lowered position, wherein the drive assembly includes
at least one motor, a plurality of gears engaging one another, wherein the plurality of gears includes a first gear and a second gear,
a translationally stationary indexer connected to the mounting bracket, and wherein the translationally stationary indexer includes the first gear and the second gear, and
a controller programmed to command the at least one motor to move the arm while each of the gears rotates.

2. The display mounting device of claim 1, wherein a bottom of the display bracket is higher than a bottom of the mounting bracket when the arm is in the raised position and the bottom of the display bracket is lower than the bottom of the mounting bracket when the arm is in the lowered position.

3. The display mounting device of claim 1, wherein the drive assembly connects and rotationally couples the display bracket to the mounting bracket, thereby synchronizing rotation of the arm and positioning of the display bracket.

4. The display mounting device of claim 1, wherein the drive assembly couples the mounting bracket to the display bracket to coordinate rotation of the display bracket based on rotation of the arm.

5. The display mounting device of claim 1, wherein the drive assembly is fixedly coupled to the display bracket such that the display bracket automatically rotates relative to the arm when the arm moves between the raised position and the lowered position.

6. The display mounting device of claim 1, wherein the mounting bracket is configured to be installed inside of the wall such that at least a portion of the arm is positioned rearwardly of a front surface of the wall.

7. The display mounting device of claim 1, wherein the arm is a cantilever arm.

8. The display mounting device of claim 1, wherein the display mounting device operates as a three-bar linkage.

9. A display mounting device, comprising:
a mounting bracket configured to mount to a wall;
a display bracket configured to hold a display:
an arm including a first end pivotally coupled to the mounting bracket and a second end pivotally coupled to the display bracket; and
a drive assembly configured to operate to raise and lower the display bracket, wherein the display bracket rotates relative to the arm when the arm is moved between a raised position and a lowered position, wherein the drive assembly applies a torque to the display bracket to substantially prevent tilting of the display bracket when the display bracket is moved between the raised position and the lowered position, wherein the drive assembly includes
at least one motor;
a plurality of gears engaging one another;
a controller programmed to command the at least one motor to move the arm while each of the gears rotates;
a first translationally stationary indexer connected to the mounting bracket; and
a second indexer connected to the display bracket.

10. A display mounting device, comprising:
a mounting bracket configured to mount to a wall;
a display bracket configured to hold a display;
an arm including a first end pivotally coupled to the mounting bracket and a second end pivotally coupled to the display bracket;

a drive assembly rotationally fixed to the display bracket and configured to cause rotation of the display bracket relative to the arm when the arm is moved between a raised position and a lowered position;

a first motor coupled to the arm and engaging a first gear coupled to the display bracket;

a second motor engaging a second gear coupled to the mounting bracket; and a controller programmed to command the first and second motors to coordinate motion of the arm and motion of the display bracket.

11. A display mounting device, comprising:

a mounting bracket configured to mount to a wall;

a display bracket configured to hold a display;

an arm including a first end pivotally coupled to the mounting bracket and a second end pivotally coupled to the display bracket;

a drive assembly configured to operate to raise and lower the display bracket, wherein the display bracket rotates relative to the arm when the arm is moved between a raised position and a lowered position, wherein the drive assembly includes at least one motor, a plurality of gears engaging one another, and a controller programmed to command the at least one motor to move the arm while each of the gears rotates; and a counterbalance assembly that cooperates with the arm to inhibit movement of the arm when a user does not apply a force to the display mounting device and to allow the user to apply a force to rotate the arm relative to the mounting bracket to move the display between a deployed position and a stowed position.

12. A display mounting device, comprising:

a mounting bracket configured to mount to a wall;

a display bracket configured to hold a display;

an arm including a first end pivotally coupled to the mounting bracket and a second end pivotally coupled to the display bracket; and a drive assembly rotationally fixed to the display bracket and configured to cause rotation of the display bracket relative to the arm when the arm is moved between a raised position and a lowered position, and wherein the drive assembly includes a first gear fixedly coupled to the display bracket, a second gear fixedly coupled to the mounting bracket, and a plurality of gears engaging one another and the first and second gears.

13. A display mounting device, comprising:

a mounting bracket configured to mount to a wall;

a display bracket configured to hold a display;

an arm including a first end pivotally coupled to the mounting bracket and a second end pivotally coupled to the display bracket, wherein the display bracket includes a front portion coupled to the display, a back portion coupled to the arm, and a hinge pivotally coupling the front portion to the back portion; and a drive assembly configured to operate to raise and lower the display bracket, wherein the display bracket rotates relative to the arm when the arm is moved between a raised position and a lowered position, wherein the drive assembly includes at least one motor, a plurality of gears engaging one another, and a controller programmed to command the at least one motor to move the arm while each of the gears rotates.

14. The display mounting device of claim 13, wherein the hinge defines a substantially horizontal axis of rotation about which the front portion rotates, wherein the substantially horizontal axis of rotation is generally perpendicular to a mid-sagittal plane of the display mounting device.

15. A display mounting device, comprising:

a mounting bracket configured to mount to a wall;

a display bracket configured to hold a display;

an arm including a first end pivotally coupled to the mounting bracket and a second end pivotally coupled to the display bracket, wherein the display bracket is configured to allow a user to pull a bottom of the display mounted to the display bracket away from the arm to angle the display upwardly;

a drive assembly configured to operate to raise and lower the display bracket, wherein the display bracket rotates relative to the arm when the arm is moved between a raised position and a lowered position, wherein the drive assembly includes at least one motor, a plurality of gears engaging one another, and a controller programmed to command the at least one motor to move the arm while each of the gears rotates.

16. A mounting device, comprising:

a display mounting device configured to carry an electronic display, the display mounting device including a mounting bracket configured to mount to a wall;

a display bracket configured to hold a display; and an elongate member including a first end rotatably coupled to the mounting bracket and a second end rotatably coupled to the display bracket; and a drive assembly fixedly coupled to the display mounting device and configured to rotationally fix the display bracket to at least one stationary component of the display mounting device to keep the display at an orientation when the elongate member is moved relative to the mounting bracket, wherein the drive assembly includes a motor, at least one sensor, an indexer assembly including a first gear with first teeth and a second gear with second teeth engaging the first teeth such that the first and second gears rotate when the elongate member rotates to move the display bracket, and a controller configured to control the motor based on output from the at least one sensor to position the display bracket at a target location.

17. The mounting device of claim 16, wherein the drive assembly is a rotational lock having a plurality of indexers that cooperate to define a rotational relationship between the display bracket and the at least one stationary component.

18. The mounting device of claim 16, wherein the display mounting device operates as a four-bar linkage or a five-bar linkage.

19. The mounting device of claim 16, wherein the first gear is pivotally coupled to the elongate member.

20. The mounting device of claim 16, further comprising a pin coupling the indexer assembly to the mounting bracket.

21. The mounting device of claim 16, wherein the first and second gears are spur gears or planetary gears.

22. The mounting device of claim 16, further comprising one or more sensors.

23. The mounting device of claim 22, wherein the one or more sensors include motion sensors or position sensors.

24. The mounting device of claim 16, wherein the indexer assembly operates based on a rotational relationship between the display bracket and the at least one stationary component.

25. The mounting device of claim 16, wherein the controller is configured to control the motor based on operation of the indexer assembly.

26. The mounting device of claim 16, wherein the at least one stationary component includes the mounting bracket.

27. The mounting device of claim 16, wherein the drive assembly includes an extendable member rotatably coupled to the display mounting device, and wherein the motor is operable to cause extension or compression of the extendable member.

28. The mounting device of claim 27, further comprising a motorized actuator configured to operate to move the display mounting device.

29. A display mounting device, comprising:

a mounting bracket configured to mount to a wall;

a display bracket configured to hold a display;

an arm including a first end pivotally coupled to the mounting bracket and a second end pivotally coupled to the display bracket;

a drive assembly configured to operate to raise and lower the display bracket, wherein the display bracket rotates relative to the arm when the arm is moved between a raised position and a lowered position, wherein the drive assembly includes at least one motor, a plurality of gears engaging one another, a controller programmed to command the at least one motor to move the arm while each of the gears rotates; and an extendable member rotatably coupled to the mounting bracket, and wherein the at least one motor is operable to cause extension or compression of the extendable member.

* * * * *